US012270646B2

(12) United States Patent
Benavides et al.

(10) Patent No.: US 12,270,646 B2
(45) Date of Patent: Apr. 8, 2025

(54) BROADBAND INTERFEROMETRIC CONFOCAL MICROSCOPE

(71) Applicant: University of Rochester, Rochester, NY (US)

(72) Inventors: Arturo Alejandro Canales Benavides, Rochester, NY (US); Paul Scott Carney, Washington, DC (US); James Matthew Zavislan, Canaandaigua, NY (US)

(73) Assignee: University of Rochester

( * ) Notice: Subject to any disclaimer, the term of this patent is extended or adjusted under 35 U.S.C. 154(b) by 304 days.

(21) Appl. No.: 17/821,613

(22) Filed: Aug. 23, 2022

(65) Prior Publication Data

US 2024/0068797 A1 Feb. 29, 2024

(51) Int. Cl.
 *G01B 9/02* (2022.01)
 *G01B 9/02091* (2022.01)
 (Continued)

(52) U.S. Cl.
 CPC ..... *G01B 9/02042* (2013.01); *G01B 9/02091* (2013.01); *G02B 21/0056* (2013.01); *G11B 7/14* (2013.01)

(58) Field of Classification Search
 CPC ............ G01B 9/02042; G01B 9/02091; G02B 21/0056; G02B 21/00; G11B 7/14; G01J 3/45; G01J 9/02; G01J 3/26
 See application file for complete search history.

(56) References Cited

U.S. PATENT DOCUMENTS 5,268,738 A * 12/1993 Baney ................ G01M 11/3172
356/73.1
5,365,335 A * 11/1994 Sorin ................ G01M 11/3172
356/73.1
(Continued)

FOREIGN PATENT DOCUMENTS

EP 1147398 B1 * 6/2004 ........... A61B 5/0066

OTHER PUBLICATIONS

Canales-Benavides et al., "Cross-correlation interferometric synthetic aperture microscopy (CC-ISAM) for Fourier-domain OCT," OSA Imaging and Applied Optics Congress 2021, CTu4B.8, 2 pages.
(Continued)

*Primary Examiner* — Abdullahi Nur
(74) *Attorney, Agent, or Firm* — Cozen O'Connor

(57) ABSTRACT

A scanning imaging method includes splitting an optical beam into a reference beam and a scanning beam, generating an interference map, and processing the interference map to produce a reconstructed image of a sample. Generating the interference map includes, for each of a plurality of sections of the sample, generating a respective interference-map element of the interference map by: (i) illuminating the section with the scanning beam to generate a plurality of scattered beams, each scattered beam corresponding to a respective spatial frequency of the scanning beam, (ii) attenuating the reference beam, (iii) generating a plurality of interference signals at least in part by interferometrically combining the plurality of scattered beams and the attenuated reference beam while modulating a phase difference between the reference beam and the plurality of scattered beams, and (iv) detecting the plurality of interference signals to yield the respective interference-map element.

21 Claims, 12 Drawing Sheets

(51) Int. Cl.
*G02B 21/00* (2006.01)
*G11B 7/14* (2012.01)

(56) References Cited

U.S. PATENT DOCUMENTS

| | | | | |
|---|---|---|---|---|
| 5,459,570 A * | 10/1995 | Swanson | ............... | A61B 5/6852 |
| | | | | 356/479 |
| 5,465,147 A * | 11/1995 | Swanson | ............ | A61B 1/00183 |
| | | | | 356/497 |
| 5,760,901 A * | 6/1998 | Hill | .................... | G01B 9/02027 |
| | | | | 356/450 |
| 5,943,134 A * | 8/1999 | Yamaguchi | ........ | G01B 11/0675 |
| | | | | 356/497 |
| 6,201,608 B1 * | 3/2001 | Mandella | ................ | A61B 3/102 |
| | | | | 356/73.1 |
| 6,667,809 B2 * | 12/2003 | Hill | ........................ | G01Q 70/06 |
| | | | | 356/516 |
| 7,602,501 B2 | 10/2009 | Ralston et al. | | |
| 8,731,272 B2 | 5/2014 | Adie et al. | | |
| 2008/0030742 A1 * | 2/2008 | Hill | .................... | G01M 11/0257 |
| | | | | 359/629 |
| 2015/0043006 A1 * | 2/2015 | de Groot | .............. | G01B 9/0209 |
| | | | | 356/497 |

OTHER PUBLICATIONS

Canales-Benavides et al., "Spectral interferometric confocal microscopy using interferometry objectives and synthetic-phase modulation," Frontiers in Optics, FM2D.3, Optica Publishing Group 2021, 2 pages.

\* cited by examiner

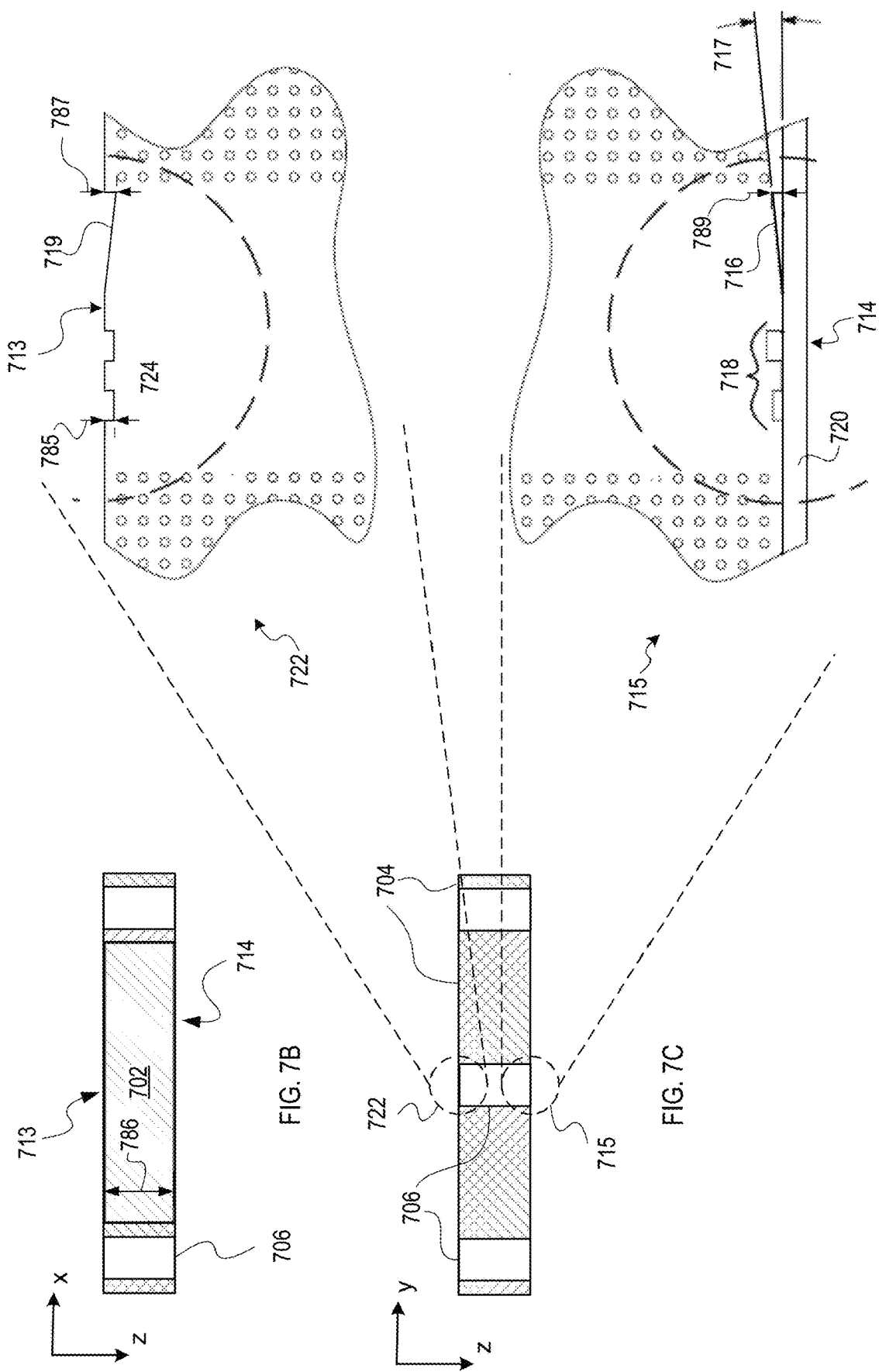

BROADBAND INTERFEROMETRIC CONFOCAL MICROSCOPE

STATEMENT REGARDING FEDERALLY SPONSORED RESEARCH OR DEVELOPMENT

This invention was made with government support under CA213149 awarded by National Institutes of Health. The government has certain rights in the invention.

BACKGROUND

In microscopy, Fourier-domain optical coherence tomography (FD-OCT) systems exploit the coherence properties of illuminating light to gain micrometer axial resolution, allowing for up to three-dimensional imaging of the scattering media with unprecedented acquisition speed and signal-to-noise ratio capabilities. For these reasons, FD-OCT is actively researched as a fundamental tool for metrology and biomedicine. Confocal scanning microscopy (CSM) is an imaging technique with optical sectioning capability, which offers advantage over wide-field microscopy with better contrast and resolution. CSM is widely used in biology and metrology for three-dimensional reconstruction and non-contact surface profiling. Some of the uses are surface topography for roughness analysis, surface inspection, inspection of microdevices and microelectromechanical systems (MEMS).

SUMMARY OF THE INVENTION

The present embodiments include a scanning imaging method that may be used in any application that utilizes data acquired with broadband coherence interferometry, such as FD-OCT. The method generates a three-dimensional, high-resolution imaging with a significant reduction in coherent artifacts and depth-dependent defocus. The method uses a reconstruction algorithm of interferometric synthetic aperture microscopy (ISAM) combined with data taken with a sinusoidal synthetic phase modulation (SPM). The present embodiments also include an imaging system, referred to as SPM-ISAM that utilizes the imaging method described herein.

In a first aspect, a scanning imaging method includes splitting an optical beam into a reference beam and a scanning beam, generating an interference map, and processing the interference map to produce a reconstructed image of a sample. Generating the interference map includes, for each of a plurality of sections of the sample, generating a respective interference-map element of the interference map by: (i) illuminating the section with the scanning beam to generate a plurality of scattered beams, each scattered beam corresponding to a respective spatial frequency of the scanning beam, (ii) attenuating the reference beam, (iii) generating a plurality of interference signals at least in part by interferometrically combining the plurality of scattered beams and the attenuated reference beam while modulating a phase difference between the reference beam and the plurality of scattered beams, and (iv) detecting the plurality of interference signals to yield the respective interference-map element.

In a second aspect, a system for three-dimensional imaging of a sample includes a beam splitter, a scanner, a phase modulator, a beam attenuator, a confocal microscope, and a processor. The beam splitter splits an optical beam into a reference beam and a scanning beam. The scanner focuses the scanning beam onto or within a section of a plurality of sections of the sample, each section producing a respective plurality of scattered beams. The phase modulator modulates a phase of the reference beam. The beam attenuator is located in an optical path of the reference beam for producing an attenuated reference beam. The confocal microscope, for each of the plurality of sections, interferometrically combines the attenuated reference beam and the respective plurality of scattered beams and generates a respective one of a plurality of two-dimensional images. The processor generates a three-dimensional image of the sample based on the plurality of two-dimensional images.

BRIEF DESCRIPTION OF THE FIGURES

FIGS. 7A, 7B, and 7C illustrate three views of an embodiment of a validation window that is mounted on or above a sample to either assist in ISAM reconstruction, validate the optical system performance, or both.

DETAILED DESCRIPTION OF THE EMBODIMENTS

References throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

The terms "sample", "object", and "test sample" are used interchangeably herein and refer to a tangible physical medium capable of being rendered as an image. The terms "light" and "field" used interchangeably, refer to optical waves. The terms "beam" or "beams" refer to a single or low-order spatial modes of an optical wave field. One example is a Gaussian laser beam. An optical wave is a vector field, an example of which is a plane wave:

$$E(r) = E_0 e^{-ik \cdot r}$$

where the field is dependent on the wavenumber, k, in the direction of the wave.

Herein, unless specified otherwise, the terms "scattered beams" and "scattered fields" refer to light scattered from a specific location in a sample being scanned from an incident beam. As scattered beams may originate from any location within the sample, the scattered beam of interest originates from a region in a sample that is being used in the calculation for reconstruction.

Throughout this specification, several terms of art are used. These terms are to take on their ordinary meaning in the art from which they come, unless specifically defined herein or the context of their use would clearly suggest otherwise.

Figure 1:
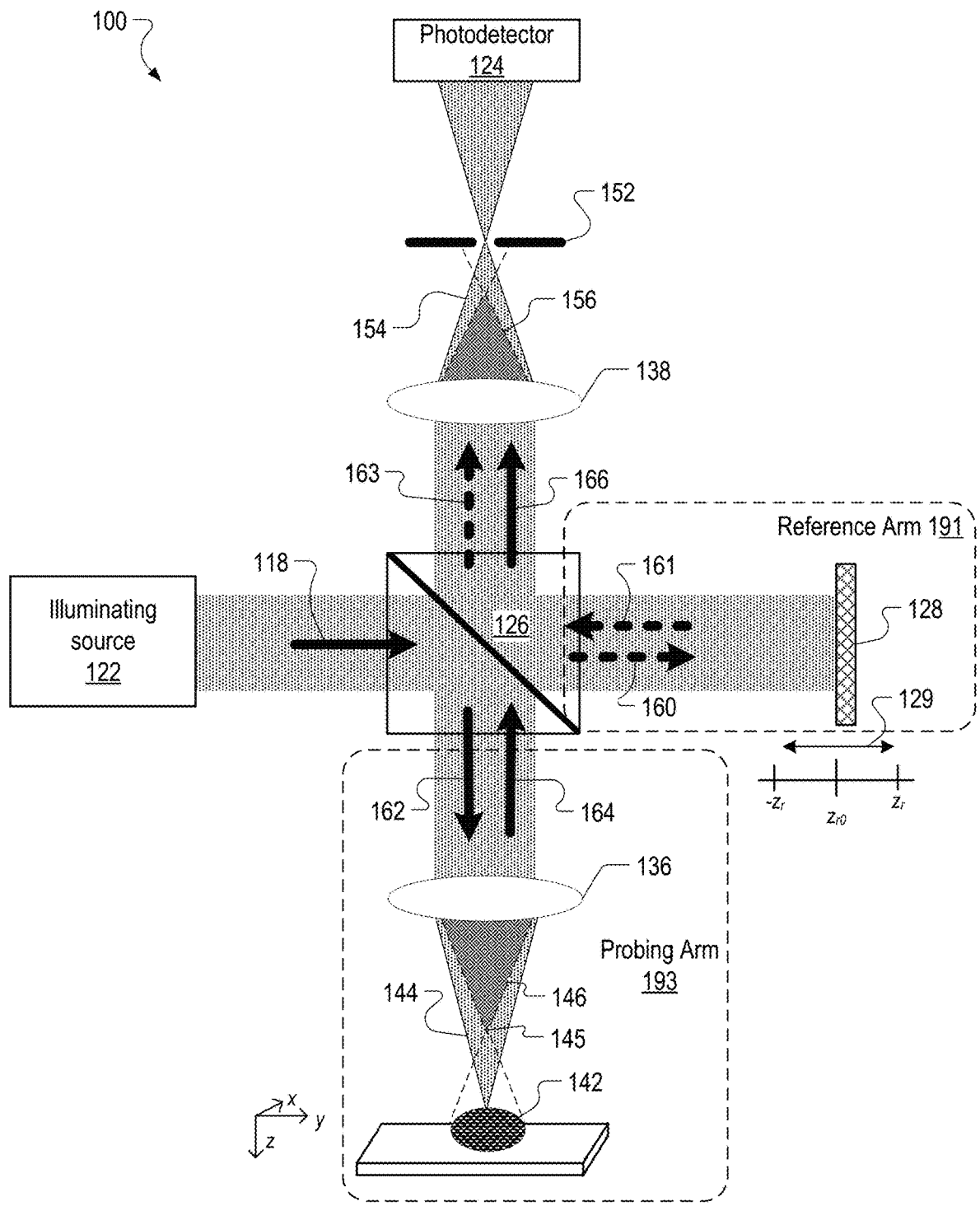
FIG. 1 illustrates an interferometric confocal microscope, in an embodiment.

As a notational convention used herein, z-axis, denoted in FIG. 1 for example, designates the axis of propagation where an illuminating light is incident upon a sample and is also referred to as axial direction. The x-y plane is formed by orthogonal axes x and y, which are each orthogonal to z-axis, and the planes parallel to the x-y plane are referred to as transverse planes. Unless otherwise specified, heights and depths of sample herein refer to the sample's extent along the axial direction. Herein, a horizontal plane is parallel to the x-y plane, a width refers to sample's extent along the y axis, and a vertical direction is along the z axis.

SPM-ISAM allows for high-resolution microscopy imaging by combining a sinusoidal synthetic-phase modulation (s-SPM) with an ISAM-based reconstruction algorithm. Herein, imaging may be two- or three-dimensional. The synthetic-phase modulation may be generated, for example, by using a sub-nanometer piezoelectric translation stage (PZT) in the probing arm of an interferometric confocal microscope. The reconstructed image has a significant reduction in coherent artifacts and depth-dependent defocus. SPM-ISAM, effectively suppresses coherent artifacts and depth-dependent defocus independently of path-length difference and irrespectively of the numerical aperture of the objective lens. In addition, the imaging system may be packaged in a compact form using an interferometric objective. Potential applications of this embodiments disclosed herein include optical coherence tomography (OCT), phase-sensitive OCT, and optical coherence elastography in biomedical imaging and quantitative phase imaging with confocal interferometry in surface metrology.

FIG. 1 illustrates an interferometric confocal microscope 100, hereinafter microscope 100. Microscope 100 includes an illumination source 122, a beam splitter 126, a reference mirror 128, an aperture 152, a lens 138, an objective lens 136, and a photodetector 124. Microscope 100 includes an interferometer portion and a confocal microscope portion. The interferometer portion includes illumination source 122, beam splitter 126, reference mirror 128, and photodetector 124. The interferometer shown as an example is of Michelson type but may be any type of interferometer. In an interferometer, an illuminating beam is divided into a reference beam and an incident beam. The incident beam, upon incident on the sample, creates a scattered beam, which propagates to a photodetector, where the photodetector detects the interference between the scattered beam and the reference beam. For example, light 118 from illumination source 122 is split by beam splitter 126 into a reference beam 160 and an incident beam 162. Reference beam 160 is reflected by reference mirror 128 and beam splitter 126 and, after propagating through lens 138, is detected by photodetector 124. Incident beam 162 is focused on to a sample 142 by objective lens 136, and upon interaction with sample 142, produces scattered beam 164. Herein, a sample, such as sample 142, may be a three-dimensional object having a volume. Incident beam 162 may be focused on to either the surface or within the volume of sample 142. Scattered beam 164 propagates through objective lens 136, beam splitter 126, and lens 138 before reaching photodetector 124. At photodetector 124, scattered beam 164 and reference beam 160, each beam having similar optical distance, are superposed and produce an interference pattern. FIG. 1 denotes reference arm 191 for a portion of microscope 100 in which reference beam 160 propagates, and probing arm 193 for a portion of microscope 100 in which incident beam 162 and scattered beam 164 propagate.

Hereinafter, the term "reference path length" refers to the total optical path length that a reference beam propagates before being detected by a photodetector. For example, reference path length in microscope 100 is the combined optical distance of propagation for each of (1) reference beam 160, propagating from beam splitter 126 to reference mirror 128, (2) reference beam 161, propagating from reference mirror 128 to beam splitter 126, and (3) reference beam 163, propagating from beam splitter 126 to photodetector 124. Additionally, the term "scattered path length" refers to the total optical distance that a scattered beam, originating from a specific location of interest within a sample, propagates before being detected by a photodetector. For example, scattered path length in microscope 100 is the combined optical distance of propagation for each of (1) incident beam 162, propagating from beam splitter 126 to the location where the scattered beam is generated in sample 142, (2) scattered beam 164, propagating from where the scattered beam is generated in sample 142 to beam splitter 126, and (3) scattered beam 166, propagating from beam splitter 126 to photodetector 124.

Aperture 152 may be an adjustable aperture to control the amount of out-of-focus light allowed into photodetector 124 and results in capturing two-dimensional image in transverse plane at different depths of the sample. For example, a smaller aperture results in thinner transverse slices of sample 142 at the focal plane of the microscope to be examined but may require a longer exposure, whereas a larger aperture results in thicker transverse slices with less localized image. This technique is generally referred to as optical sectioning. For example, a focused beam 144 at the top surface of sample 142 results in a focused scattered beam 154 at aperture 152 that is detected by photodetector 124. However, out-of-focus scattered beams 156 result from scattering of out-of-focus beam 146 having a beam waist 145 either above (−z offset as shown) or below (+z offset) sample 142. Out-of-focus scattered beam 156 has a larger beam spot than allowed by aperture 152 and is mostly not detected by photodetector 124. Aperture 152, therefore, results in preferentially detection of the in-focus light and optical sectioning of the sample in axial direction.

Microscope 100 is only an example of an interferometric confocal microscope and not intended to be limiting in any way. Illumination source 122 may be a coherent source, such as a laser. In certain embodiments, illumination source 122 is a swept source, which is a tunable wavelength laser that may be configured to sweep over a range of wavelengths. A swept source may be used to retrieve depth information for a sample of flat or known uniform dispersion. A swept source may also allow a wavelength-dependent imaging of a sample, which may apply to far-field spectroscopic imaging. Photodetector 124 may include one or more of a spectrometer, a charge-coupled detector (CCD) image sensor and a single photo-sensitive element, such as a photodiode or a photomultiplier tube.

FIG. 1 denotes movement 129 of reference mirror 128 along the direction of the reference beam. When reference mirror 128 is positioned at $z_{r0}$, the optical path length of the reference beam is the same as the optical path length of the combined incident and scattered beams to and from the focus of incident beam 144. In this configuration with reference mirror 128 positioned at $z_{r0}$, the system is said to be configured for zero phase difference. Movement 129 may be modulated, which may be achieved by mounting reference mirror 128 on a piezoelectric translation stage. Movement 129 may be linear. However, the main limitation of a linear movement is the limited travel range of the piezoelectric translation stage, which is required to be closed-loop for positioning feedback. In the preferred embodiments, movement 129 is sinusoidal, and an open-loop piezoelectric translation stage may be used. Some of the advantages of sinusoidal phase reference are that (1) open-loop piezoelectric translation stage has less noise than a closed-loop piezo stage, and (2) the exact position of the reference mirror is not necessary as reference mirror 128 oscillates between $-z_r$ and $z_r$. The period of the oscillation depends on the weight of the translation stage including reference mirror 128. The frequency of the oscillation may range up to a few kilohertz. The cost of an open-loop piezo stage can be significantly lower than a closed-loop piezo stage as well.

Additionally, there may be alternate techniques for producing the phase difference between the reference beam and scattered beams without departing from the scope of present disclosure. For example, one technique is to create a path length difference by modulating the position of reference mirror 128 (e.g., movement 129), as described above. In another technique, the path length of scattered beams may be modulated by modulating the position of sample 142. In another technique, which advantageously does not require a mechanical translation stage, a controllable photonic device, such as an electro-optical modulator, may be used to control the phase of either beams.

Figure 2:
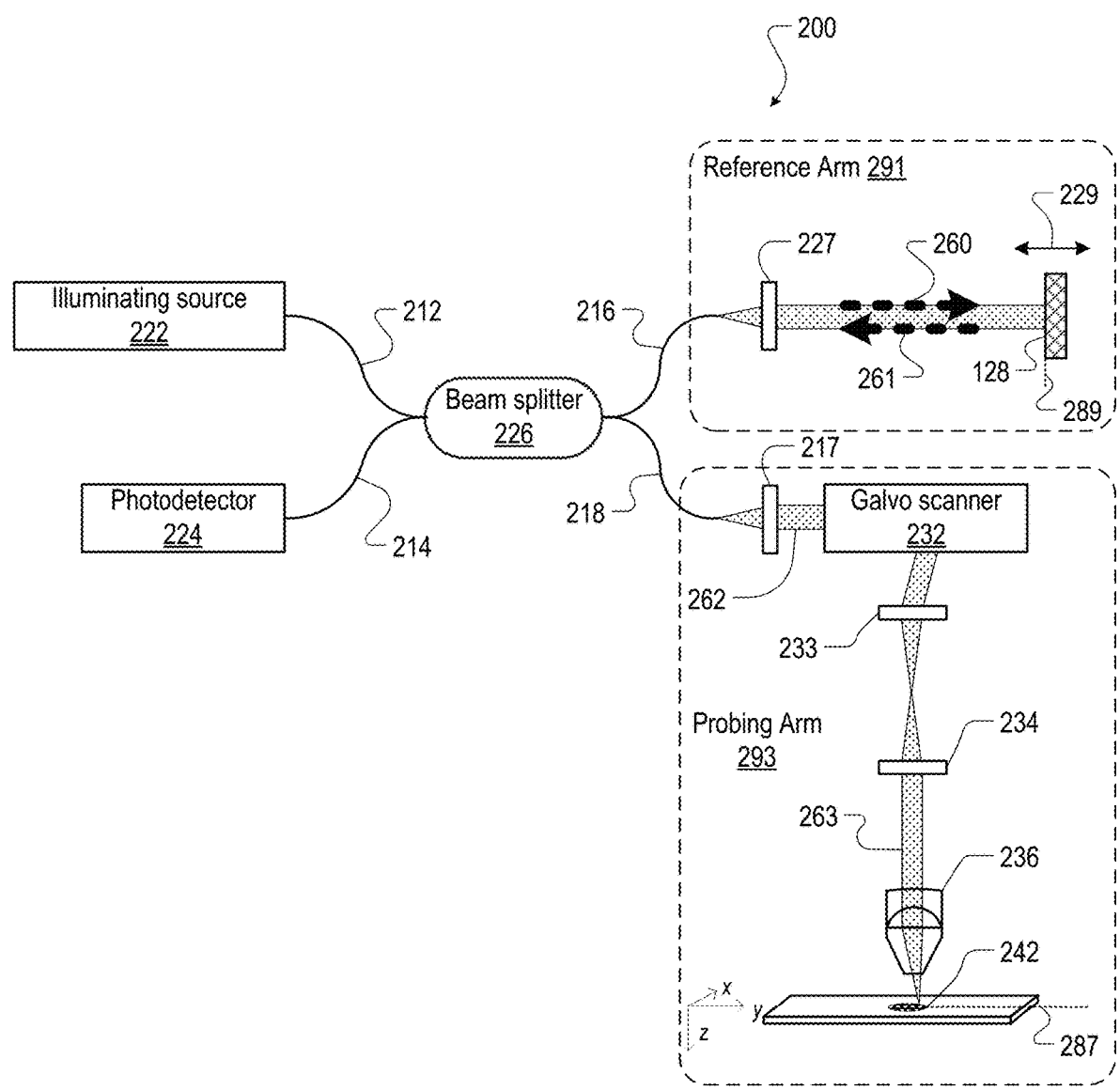
FIG. 2 illustrates an interferometric confocal scanning microscope, in an embodiment.

FIG. 2 illustrates an interferometric confocal scanning microscope 200, hereinafter microscope 200. Microscope 200 is an example of microscope 100 that includes the ability to scan a sample point-by-point with an addition of a galvanometer optical scanner. Similar to FIG. 1, FIG. 2 denotes a reference arm 291 for a portion of microscope 200 in which reference beam 260 propagates, and a probing arm 293 for a portion of microscope 200 in which incident beam 262 propagates.

Microscope 200 includes an illuminating source 222, a beam splitter 226, and a photodetector 224, which are examples of illuminating source 122, beam splitter 126, and photodetector 124, respectively. Beam splitter 226 may be a fiber coupler. Photodetector 224 may include a single photosensitive element. Microscope 200 also includes galvanometer optical scanner 232 for scanning the sample in transverse plane point-by-point, collimating lenses 227 and 217, tube lenses 233 and 234 for relaying the incident beam, and optical fibers 212, 214, 216, and 218, which in part serves as an aperture for confocal microscope. Illuminating source 222 may be either a tunable swept laser or a low-coherence broadband source.

In an example mode of operation of microscope 200, light from illuminating source 222 propagates in optical fiber 212 and is split by beam splitter 226 into reference beam 260 and incident beam 262. Reference beam 260 propagates in optical fiber 216, is collimated by collimating lens 227, and is reflected by reference mirror 128 as a reflected reference beam 261. Reflected reference beam 261 propagates in optical fibers 216 and 214 and is detected by photodetector 224. Incident beam 262 travels in optical fiber 218 and is collimated by collimating lens 217 before being reflected by galvanometer optical scanner 232. Galvanometer optical scanner 232 directs incident beam 262, after passing through tube lenses 233 and 234, to relay the scanned beam to the objective pupil, and through objective lens 236, for focusing, to a specified point on transverse plane of sample 242. Scattered beam from sample 242 propagates back along beam path 263 and is superposed with reflected reference beam before being detected by photodetector 224.

Galvanometer optical scanner 232 may have a scan angle suitable for directing the incident beam to any point on the transverse plane of the sample. Reference mirror 128 may be modulated in the direction of reference beam to produce phase modulation in the interferometer. To produce modulation of reference phase, reference mirror 128 may be mounted on a piezoelectric translation stage to produce movement 229. Movement 229 is an example of movement 129 and is one of a linear and a non-linear, such as sinusoidal, movement, which produces path length modulation as a function of time in the reference beam. FIG. 2 denotes section lines 287 and 289. Section line 287 indicates the focal plane of microscope 200. Section line 289 indicates the reference mirror plane, which describe the position of reference mirror 128. Section lines 287 and 289 in part define path lengths of the in-focus scattered beam and the reference beam, respectively. The difference in path lengths defined by section lines 287 and 289 is path length difference (PLD) or $z_0$. When scanning a sample, section line 287 represents a line scanned by the focus of the incident beam on sample 242, which may be at the exposed surface of sample 242. Scatters at the surface may then emit a scatter field. The PLD is then the difference between the reference mirror plane and the focus of incident beam: $z_0 = z_{reference\ mirror\ plane} - z_{incident\ beam\ focal\ plane}$.

A single-photo-sensitive element detector, such as photodetector 224 in embodiments, allows the measurement of superposed fields corresponding to each point being scanned on sample 242. The superposition of reference field, $E_r(k)$, which depends on wave number k, and scattered field, $E_s(r, k)$, at transverse coordinate r of the scanned point on the sample is detected by the detector, such as photodetector 224, as a phase-dependent intensity. The real-valued interferometric intensity $\tilde{I}_F$ is therefore a function of the wave number k and transverse coordinate r and is the sum of the reference field $E_r(k)$ and the field scattered from the sample $E_s(r, k)$:

$$\tilde{I}_F(r,k) = S_{rr}(k) + S_{ss}(r,k) + e^{ikz_0}S_{sr}(r,k) + e^{-ikz_0}S^*_{sr}(r,k) \quad (1)$$

where $S_{nm}(r, k) = \langle E_n(r, k)E^*_m(r, k) \rangle$, $z_0$ is a constant path-length difference between the reference mirror plane and the incident beam focal plane, and $S_{sr}(r, k)$ is the interference cross term for the stochastic backscattered field and contains the information of interest. Applying an inverse Fourier transform of $\tilde{I}_F(r, k)$ brings the data back to the spatial domain:

$$I_T(r,z) = R_{rr}(z) + R_{ss}(r,z) + R_{sr}(r,z+z_0) + R^*_{sr}(r,-z-z_0) \quad (2)$$

where $R_{sr}(r, z) = 2\pi \int S_{sr}(r, k)e^{ikz}dk$ is a cross-correlation term that is directly related to the volumetric structural information of the sample and is further described in FIGS. 3A-3D below. $R_{rr}(z)$ and $R_{ss}(r, z)$ are autocorrelation terms for reference field and scattered field, respectively. $R_{sr}^*$, is a conjugate cross-correlation term. $R_{ss}(r, z)$ and $R^*_{sr}$, are referred to as coherent artifacts hereinafter. The image produced by spatial domain intensity, $I_T(r, z)$, is referred to as post-processed image henceforth.

As an example of reconstructing a post-processed image described above, FIGS. 3A-3D show a simulated sample and processing of the simulated sample into a reconstructed image that may be performed by a scanning microscope, such as microscopes 100 and 200. FIG. 3A illustrates a simulated system 300 that includes a simulated sample 372. Simulated system 300 illustrates incident beam 162, scattered beam 164, and objective lens 136. Incident beam 162 may be generated by a tunable laser. Simulated system 300 includes a light cone 369, which depicts the cross-section of a gaussian geometry of incident beam 162. Simulated sample 372, which is in a plane parallel to y-z plane and has a width 375 and a depth 373. Simulated sample 372 is comprised of randomly distributed scatter points, such as scatter points 391 and 395, each of which produces a respective scattered beam 164 from incident beam 162. Focal plane 376 of objective lens 136 is located inside simulated sample 372 at a depth 377 with respect to a top surface of simulated sample 372. Reference mirror 128 (not shown in FIG. 3A) is positioned such that the reference path length and the in-focus scattered path length are the same, $z_0=0$. This implies the image of the reference mirror in the reference arm, reference mirror plane 378, coincides with focal plane 376.

Figure 3B:
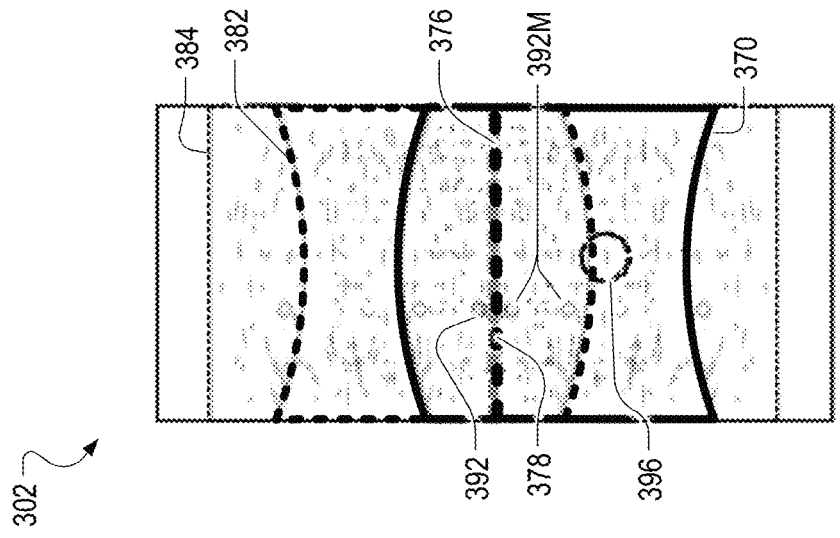
FIGS. 3B-3D show reconstructed images of the simulated sample of FIG. 3A.
Figure 3A:
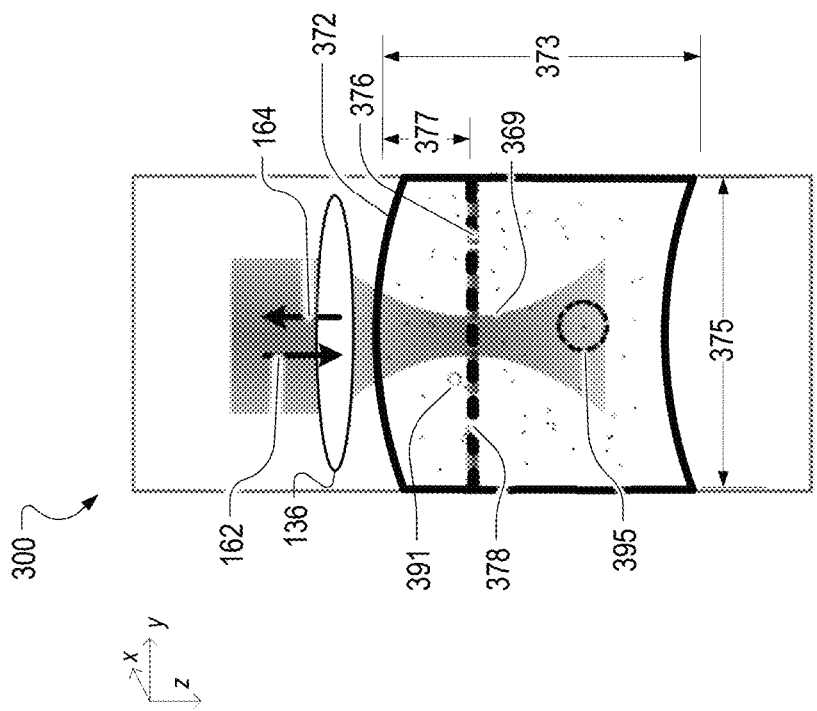
FIG. 3A illustrates a simulated system that includes a simulated sample.
Figure 3D:
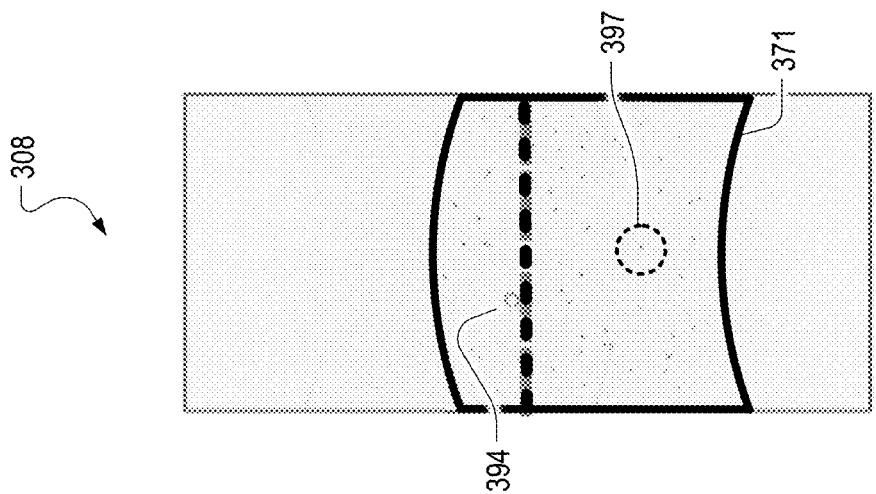
Figure 3C:
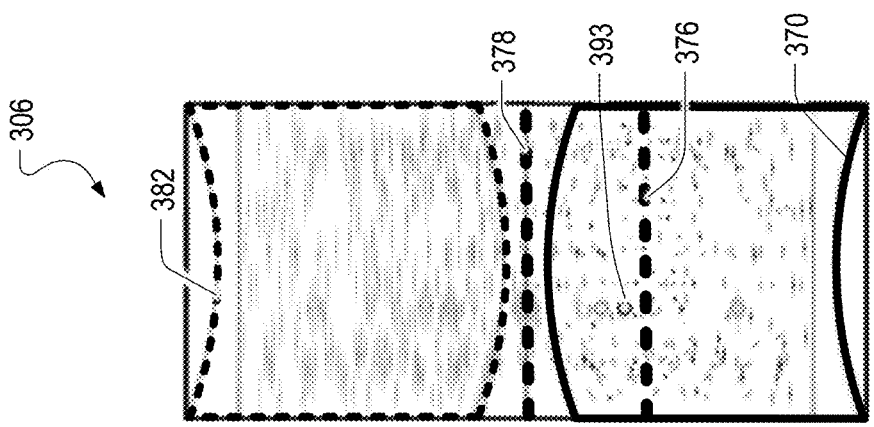

FIGS. 3B-3D show reconstructed images of simulated sample 372 in the same plane as simulated sample 372, a plane parallel to y-z plane. Reconstructed images show cross-correlation term, $R_{sr}(r, z)$, in an area 370, conjugate cross-correlation artifact term, $R^*_{sr}(r, z)$ in an area 382, and autocorrelation term, $R_{ss}(r, z)$, in an area 384. Area 370 corresponds to the object under reconstruction. Areas 382 and 384 correspond to coherent artifacts after reconstruction. In FIG. 3B, reconstructed image 302 is reconstructed using a Fast Fourier Transform (FFT) along wavenumber k. In reconstructed image 302, where focal plane 376 and reference mirror plane 378 are at the same location (i.e., $z_0=0$), area 370 overlaps with area 382. Accordingly, scatter point 391 (FIG. 3A) is reconstructed as scatter point 392 along with its multiple mirrored points 392M due to the overlap. In addition, reconstructed scatter point 396 from scatter point 395 (FIG. 3A) indicates depth-dependent defocus, which becomes worse for higher numerical aperture objective lens. To remove the overlap between area 370 and area 382, a phase difference may be introduced in the reference beam. For example, reference mirror plane 378 may be placed away from focal plane 376 by moving the reference mirror (e.g., reference mirror 128), as shown in FIG. 3C.

In FIG. 3C, reconstructed image 306 is reconstructed using ISAM. Reference mirror plane 378 is shifted away from incident beam focal plane 376, such that $z_0 \neq 0$. Reconstructed image 306 shows isolated area 370 with correctly reconstructed scatter point 393 from scatter point 391 in simulated sample 372. However, when the displacement of reference mirror plane 378 is outside the maximum sensitivity region of the interferometric microscope, the range of reconstruction may be reduced, and the interferometer may be more sensitive to any phase fluctuation errors when the phase difference is greater than zero.

In FIG. 3D, a reconstructed image 308 shows a combined reconstruction using a s-SPM and an ISAM reconstruction algorithm which combined is referred to as SPM-ISAM. By combining an s-SPM method with ISAM, SPM-ISAM remedies the shortcomings described above by suppressing coherent artifacts and reducing depth-dependent defocus in the data acquired with broadband coherence interferometry, such as FD-OCT. In addition, the SPM-ISAM reconstruction provides spatial invariant resolution, which advantageously may result in improved image fidelity, and a high-resolution three-dimensional image. This may be accomplished by solving a broadband coherence inverse-scattering problem that includes the effect of a sinusoidal synthetic-phase reference (SPR) encoded into the three-dimensional interferometric data using a sub-nanometer piezoelectric translation stage.

For example, the transverse Fourier transform of the measured signal obtained by means of SPM-ISAM, $I_S(r, k)$, is:

$$\tilde{I}_S(q,k) = \tilde{S}_{rr}(k) + \tilde{S}_{ss}(q,k) + \Sigma_{n=-\infty}^{\infty} e^{in\phi} \{J_n(f_0 q_z^n(q,k)) \tilde{S}_n(q,k) + J_{-n}(f_0 q_z^{-n}(q,k)) \tilde{S}^*_{-n}(q,k)\}. \quad (3)$$

In equation (3), $q_z^{\pm n}(q, k) = \sqrt{(2k)^2 - |q^{\pm n}|^2}$ is the axial frequency coordinate with wavenumber $k = 2\pi r/\lambda$, and shifted transverse frequency coordinate $q^{\pm n} = q \pm n q_s$, where $q_s$ is a synthetic frequency. $J_n$ is a Bessel function of the first kind with integer value n that depends on the PZT modulation amplitude $f_0$ and the axial coordinate $q_z^n$, and $\phi$ is a constant phase. The spectral density:

$$\tilde{S}_n(q,k) = f_n(q, q_z^n, k) \tilde{n}_n(q^n, -q_z^n(q,k)) \quad (4)$$

is the spectral density of the backscattered field under the first Born approximation centered around the point $q = -nq_s$, containing the frequency information of the object via the Fourier transform of the susceptibility $\tilde{\eta}$, and a linear operator equivalent to the transfer function of the optical system:

$$f_n(q, q_z^n, k) = i4NA^2 A(k) \frac{k^2}{q_z^n(qJ_<)} \exp[-iq_z^n(q, k) z_0] \exp\left[\frac{-\pi^2 |q^n|^2}{4NA^2 k^2}\right]. \quad (5)$$

In equation (5), A(k) is the power spectral density of the reference beam, and NA is the numerical aperture of the collection lens. A Fourier-based filtering algorithm is then used to extract $\hat{S}(q, k)$ from $\tilde{I}_S(q, k)$ and to suppress coherent artifacts. Once $\hat{S}(q, k)$ is extracted, the data may be inverted using ISAM reconstruction, such that:

$$\tilde{\eta}^+(q, q_z) = H^+(q, q_z, k) \hat{S}(q, k)\big|_{k=\frac{1}{2}\sqrt{|q|^2 + q_z^2}}, \quad (6)$$

where $H^+(q, q_z, k)$ is the Tikhonov regularized pseudo-inverse kernel with regularization constant N:

$$\tilde{\eta}^+(q, q_z, k) = \frac{f^*(q, k, q_z)}{|f(q, k, q_z)|^2 + Nk/q_{z(q,k)}} \quad (7)$$

and $\tilde{\eta}^+(q, q_z)$ is the pseudo-inverse, where $\tilde{\eta}^+(q, q_z)$ is the Fourier transform of the desired reconstructed image Consequently, SPM-ISAM image may be reconstructed independently of path length difference $z_0$, and regardless of the numerical aperture of the system. In reconstructed image 308, simulated sample 372 (FIG. 3A) is reconstructed as reconstructed sample 371 in reconstructed image 308 in FIG. 3D. Scatter points 391 and 395 in FIG. 3A are correctly reconstructed as reconstructed scatter points 394 and 397.

Figure 4:
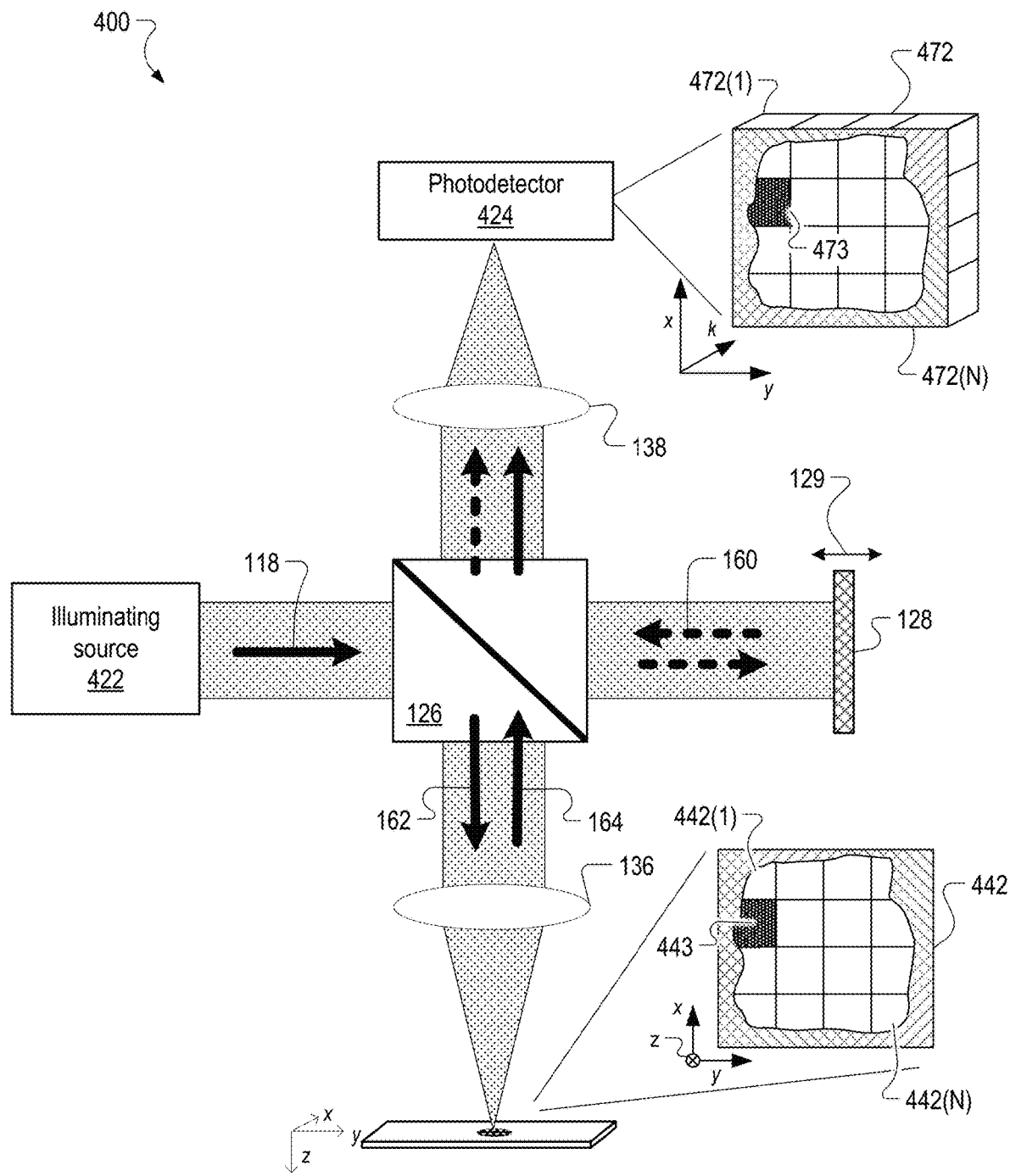
FIG. 4 is a schematic of a scanning microscope, in an embodiment.

FIG. 4 is a schematic of a scanning microscope 400, microscope 400 henceforth. Microscope 400 is microscope 100 configured to produce synthetic-phase modulation (SPM). Microscope 400 may be used for producing a three-dimensional image of a sample by utilizing SPM-ISAM reconstruction. While microscope 400 includes an interferometer with open-air beam paths, the interferometer may include other optical components, such as optical fibers as light guides, collimators, additional mirrors, without departure from the scope of the present invention. Microscope 400 includes a photodetector 424, which is an example of photodetector 124. Photodetector 424 may include a single photo-sensitive element, such as a single photodiode, or an image sensor, such as a CCD coupled through a spectrometer. Microscope 400 also includes an illuminating source 422, which is an example of illuminating source 122. Illuminating source 422 may be a swept-laser source or a broadband low-temporal coherence source such that the depth profile of a sample 442 may be recovered using frequency scanning or spectroscopic detection, respectively.

Reference beam 160 may be continuously modulated such that for each scanned region of sample 442, reference beam 160 has a different phase than the previously scanned point. For example, reference mirror 128 may be mounted on a sub-nanometer piezoelectric translation stage (PZT) and translated with a sinusoidally varying amplitude. Additionally, for each scanned region 442(i), where i is a positive integer less than or equal to a total number of scanned regions N, the wavelength of illuminating source 422 is scanned, such that the depth profile at scanned region 442(i) may be obtained after processing. The detected signals, comprising in part scattered beams originating from various depth location at scanned region 442(i) in sample 142, are registered to a detected region 472(i) in a detected data 472. Detected region 472(i) may be a pixel or a group of pixels. For example, for measurement at a scattered region 443 in x-y plane, the frequency (and hence the wavenumber k) of illuminating source 422 is scanned. The scattered fields from various depths in z, corresponding to the wavenumber, are generated and interfered with the reference field before reaching photodetector 424. The resulting fields having frequency, wavenumber, and wavelength dependency is recorded in detected region 473 in detected data 472. Since data acquisition is performed in a serial manner, the data at each acquisition, or at each scanned location, is collected at different times. The phase of reference beam 160 may have been adjusted in between the subsequent acquisitions of data (e.g., between detected regions 472(i) and 472(i+1)). As such, each detected region 472(i) may be associated with a specific reference field.

In general, the modulation of the reference field produced by PZT is either a linear or non-linear (e.g., sinusoidal). SPM-ISAM reconstructed with a linear or non-linear SPM requires a specific reconstruction approach depending on the type of SPM implemented. For example, the SPM-ISAM method described above applies to sinusoidal SPM. Unlike linear SPM, sinusoidal SPM is not limited by the PZT range and frequency response, allowing for faster imaging speeds. Additionally, more robust and compact imaging systems may be designed using sinusoidal SPMs.

In embodiments, microscopes 100, 200 and 400 use a non-common path Michelson interferometer with at least two independent arms (e.g., one probing arm, such as probing arms 193 and 293, for probing the sample, and one reference arm, such as reference arms 191 and 291, for modulating the reference field) to suppress coherent artifacts. Non-common path interferometers may however be highly sensitive to mechanical vibration. To minimize the noise caused by at least mechanical vibration, a common-path interferometer may be used in interferometric confocal microscopes. In embodiments, a common-path interferometer, such as that used in microscope 500, includes an interferometric objective lens system.

Figure 5A:
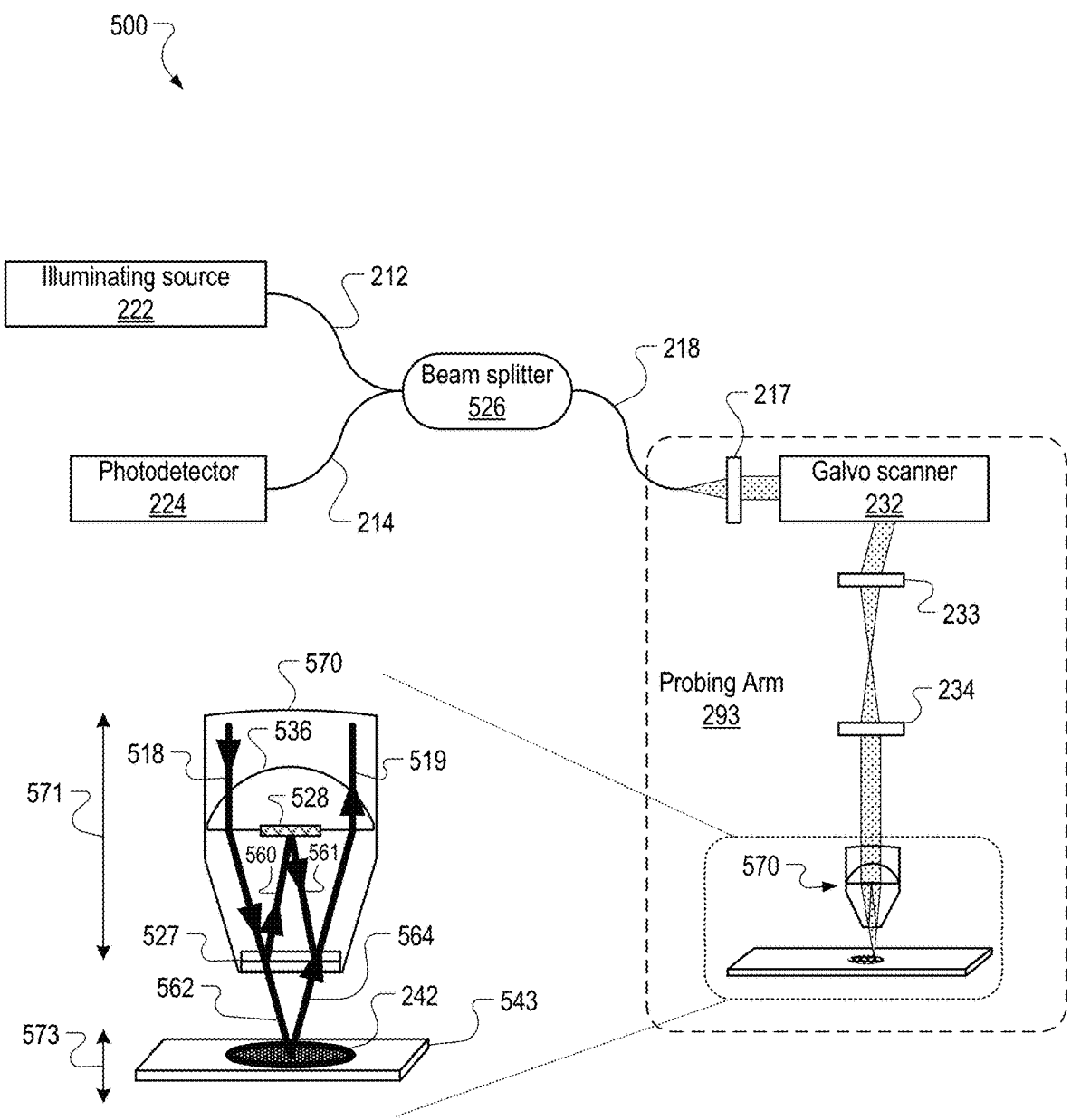
FIG. 5A illustrates an interferometric confocal scanning microscope, in an embodiment.

FIG. 5A illustrates an interferometric confocal scanning microscope 500, microscope 500 henceforth. Microscope 500, which is microscope 200 configured for a common-path interferometer topology, includes only probing arm 293 of microscope 200. For example, reference arm 291 of microscope 200, which includes reference mirror 128, is integrated into probing arm 293. Microscope 500 includes a beam splitter 526, which replaces beam splitter 226 and may be a 2×1 optical fiber coupler. Microscope 500 further includes an interferometric objective lens 570 (objective 570 henceforth), which replaces objective lens 236.

In objective 570, after propagating through objective lens 536, illuminating light 518 is divided, by a beam splitter 527 at the bottom tip of the objective housing, into incident beam 562 and reference beam 560. Reference beam 560 is reflected by the surface of a reference mirror 528 and further reflected by beam splitter 527. Incident beam 562 is incident upon sample 242 at a transverse coordinate (a,b), and resulting scattered beams 564 are reflected back to beam splitter 527, where scattered beams 564 combine with reflected reference beam 561. Combined beam 519, which is a superposition of reflected reference beam 561 and scattered beams 564, is directed to photodetector 224. Photodetector 224 detects the superposition of the reference field and the scattered fields for the coordinate (a,b) of sample 242.

It may be desirable to adjust the amount of light in the reference field relative to the scattered field in order to maximize the signal to noise of the detected image irradiance. The amount of light in the reference field is set by the product of the reflectance of beam splitter 527 and the reflectance of the reference mirror 528. However, the light in the scattered field depends on various factors including properties of sample 242, such as material refractive index and heterogeneity, the wavelength of illumination, and the depth of imaging. Because the amount of light in the scattered field can change with object and depth of image, optimizing the signal to noise of the detected image irradiance requires adjusting either the reflectance of beam splitter 527 or reference mirror 528, or both. U.S. Pat. No. 6,538,809 discloses a Mirau objective with a variable reflectance beam splitter. In U.S. Pat. No. 6,538,809 the beam splitter regions with different reflectance are disposed around the perimeter of a circular transparent disk or along the length of a transparent rectangle. By mechanically moving the disk or rectangle to different regions, the reference field strength may be adjusted. Additionally, US Patent Application 2018/0031415 discloses a continuous variable broadband reflector that may be used in a Mirau, Linnik or Michelson interferometer as a beam splitter or reference mirror, or both. The disclosed reflectors change reflectance based on material phase changes and are controlled by temperature. The disclosed reflectors may additionally be used to control the amount of light in the reference field.

Figure 5B:
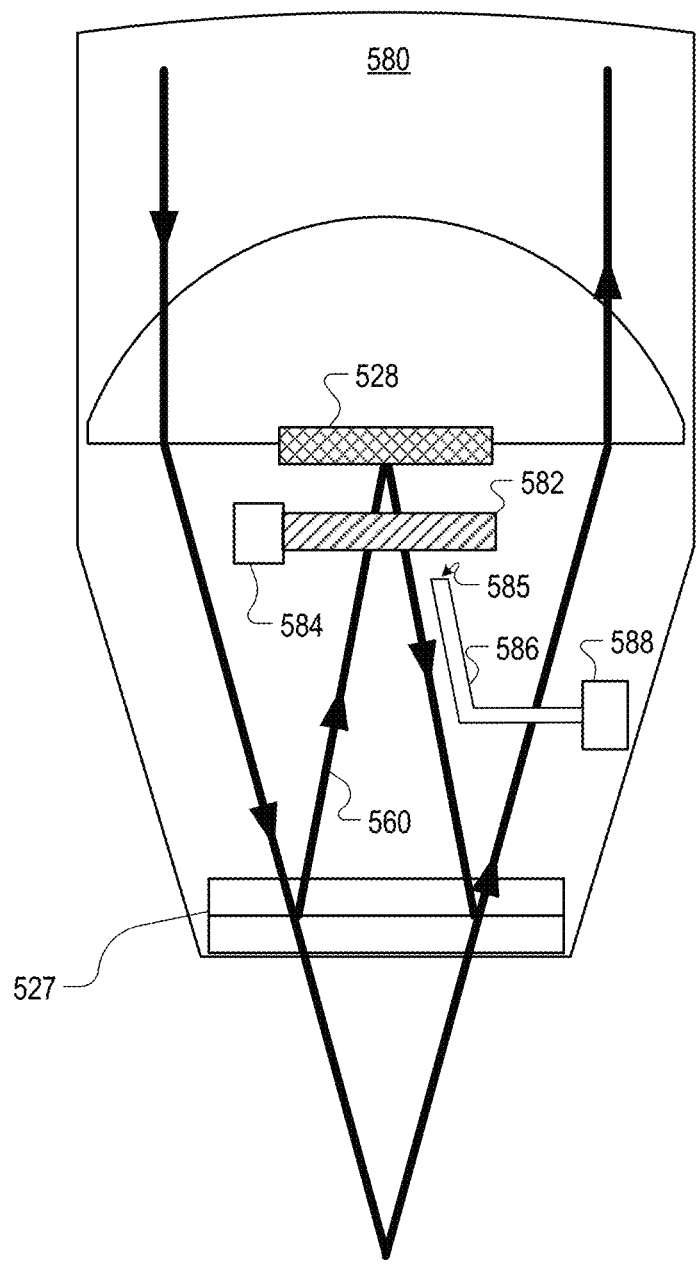
FIG. 5B illustrates an interferometric objective lens that may be included in the microscope of FIG. 5A.

Additionally, it is also possible to control the amount of light in the reference field by photochromic absorption. FIG. 5B illustrates an interferometric objective lens 580 that may be included in microscope 500 of FIG. 5A. Objective lens 580 adds a photochromic absorption capability to objective 570. Objective lens 580 is shown as a Mirau objective, but may be of other design, such as Michelson, without departing from the scope hereof. Objective lens 580 includes a photochromic window 582, which may be formed of glass, inserted between the beam splitter 527 and the reference mirror 528 and an ultraviolet A (UVA) source 584. In one embodiment, UVA illumination is provided by UVA source 584 that may be mounted on the perimeter of photochromic window 582.

UVA source 584 may include one or more light emitting diodes (LED). UVA source 584 provides edge illumination, such that the light provided by UVA source 584 is contained inside photochromic window 582 by total internal reflection. The thickness and refractive index of photochromic window 582 may be a consideration in the optical design of the objective. In an example use scenario, reference beam 560 is transmitted through photochromic window 582 twice: first as it is incident on reference mirror 528 and after reflection from reference mirror 528. The reflected reference field can be monitored by a multimode optical fiber 586 oriented parallel and coincident to the marginal ray of the reflected reference beam with an input face 585 of optical fiber 586 facing the reference mirror 528. The reference field light coupled into optical fiber 586 is monitored by an optical detector 588 at the output of the fiber. The amount of light detected by optical detector 588 may be calibrated to the total amount of light in the reference beam 560. The output of UVA source 584 may be adjusted using the output of optical detector 588 to set and maintain the desired amount of light in the reference field.

The technique of adjusting the amount of light in the reference field described above in objective lens 580 may be applied to other type of interferometric objectives without departing from the scope hereof. Mirau objectives, such as objective lens 580, have a common-path topology. In contrast, Michelson objectives have a non-common path topology, however their restrictive size may be incompatible with some interferometric microscopy, such as a full-range FD-OCT. However, sinusoidal synthetic-phase modulation using a PZT in the probing arm (e.g., probing arm 293) when implemented with the reconstruction algorithms described herein may be suitable for a full range broadband interferometric microscopy and may remedy the noise introduced by mechanical vibration and the coherent artifacts.

Microscope 500 is a compact system by using an interferometric objective and is more robust in mechanical vibration by modulating probing arm 293 of the interferometer. However, interferometric objectives, such as objective 570, may increase coherent artifacts from having the focal plane and the reference mirror plane at nearly the same location (e.g., reconstructed image 302) due to the design of the objectives. The coherent artifacts may be remedied by using the s-SPM method alone or by combined SPM-ISAM method. In certain embodiments, synthetic phase modulation is performed on objective 570. For example, objective 570 is mounted on a PZT to produce movement 571. In other embodiments, SPM is performed on sample 242. For example, sample holder 543 is mounted on a PZT to produce movement 573.

Figure 6:
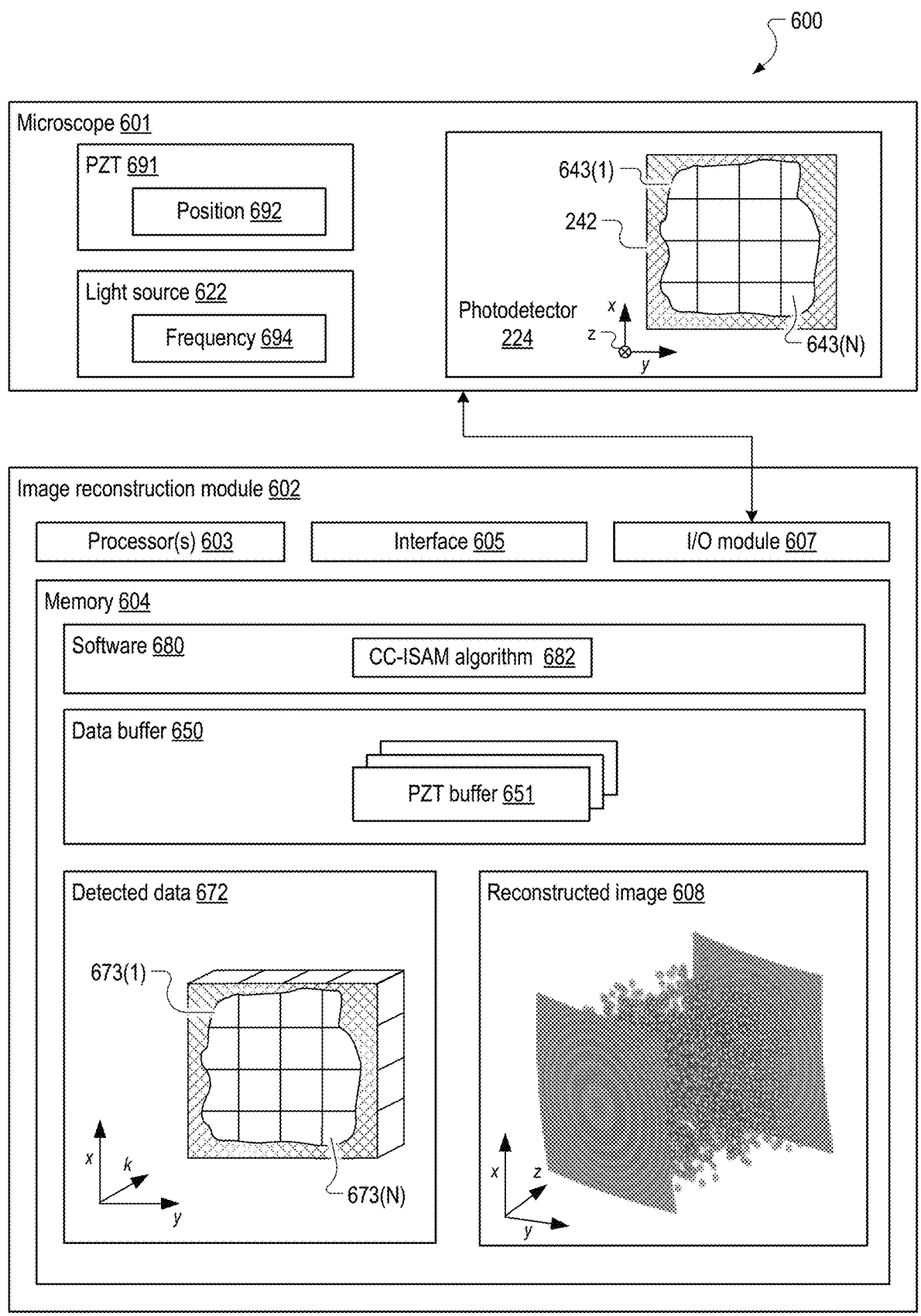
FIG. 6 is a schematic of a three-dimensional imaging microscope system, in an embodiment.

FIG. 6 is a schematic of a three-dimensional imaging microscope system 600, hereinafter system 600, for producing a three-dimensional image of a sample. System 600 includes an image reconstruction module 602, hereinafter IRM 602, and a microscope 601, which is an example of microscope 500 and is communicatively coupled with IRM 602. Microscope 601 includes a light source 622, which may be a swept-laser source or a broadband coherence source, for depth information retrieval, such as used for three-dimensional imaging. Light source 622 may be communicatively coupled with IRM 602 such that frequency 694 of light source 622 can be controlled, monitored, or both. Microscope 601 further includes a PZT 691 that phase modulates at least one of objective 570 and sample holder 543. Position 692 of PZT 691 may be communicated to IRM 602.

IRM 602 includes at least one processor 603 and a memory 604. Memory 604 stores computer-readable instructions as software 680. When executed by processor 603, software 680 causes processor 603 to implement the functionality of IRM 602 as described herein. Software 680 may be, or include, firmware, and includes SPM-ISAM algorithm 682. Memory 604 further includes a detected three-dimensional data 672, a reconstructed three-dimensional image 608, and a data buffer 650. Data buffer 650 may include at least one of PZT buffer 651, which may store position 692 of PZT 691 as described below. IRM 602 further includes an I/O module 607 for communicating with microscope 601, and may include an interface 605, which allows communication with a user. For example, interface 605 may include a viewing device, such as a dedicated monitor, for viewing the reconstructed image.

Memory 604 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 604 may be integrated into processor 603.

In embodiments, processor 603 controls PZT 691 to phase modulate the reference beam. For example, when objective 570 is mounted on PZT 691, PZT 691 produces movement 571, which may be a sinusoidal motion in z-direction and may continue throughout the measurement process. The position of objective 570 may be monitored as position 692 and communicated to processor 603 by PZT 691 via I/O module 607. Processor 603 may store position 692 in PZT buffer 651 in data buffer 650.

Additionally, processor 603 directs microscope 601 to focus the incident beam onto section 643(i), where i is a positive integer less than or equal to the total number of scanned sections N, at transverse coordinate $(a, b)_i$ of sample 242. Processor 603 further controls light source 622 to scan frequency 694 for every section 643(i), such that data related axial information (i.e., depth data) may be acquired and processed. The interference pattern between the reference beam and scattered beams from section 643(i) is measured by photodetector 224 and is reported to processor 603 via I/O module in IRM 602. Processor 603 stores the interference pattern from section 643(i), which contains information associated to the depth profile of the sample via the frequency, into location 673(i) in detected three-dimensional data 672 in memory 604. In embodiments, the measurement period for each section is of an order of magnitude smaller than the period of the phase modulation. This measuring process is repeated for every section from 643(1) to 643(N), corresponding to memory location from 673(1) to 673(N) in memory 604. Processor 603, after acquiring detected three-dimensional data 672, invokes SPM-ISAM algorithm 682 to obtain reconstructed three-dimensional image 608 that has significantly reduced coherent artifacts and depth-dependent defocus.

When using the ISAM algorithm, optimally reconstructing an image requires knowledge of the operational parameters of the microscope. Important operational parameters include, but are not limited to, a distance between the illumination beam focus and the interferometer zero reference plane, the initial value and separation of the samples of the illumination k-vector and the extent and spacing of the scanned spots across the field of view. These parameters may be characterized at the time of system construction.

However, these parameters may change with time, operation temperature, operation orientation or vibration.

One method to estimate the operational parameters of the microscope includes using nominal parameters that were measured when the system was initially constructed and then modify each of the parameters during ISAM reconstruction. After reconstruction, an image quality metric may be applied to the reconstructed image. One image quality metric, termed the sharpness metric, uses the power spectrum content of the high spatial frequencies in the reconstructed image. The power spectrum of an optimally reconstructed image should be limited by the modulation transfer function of the optical system. By tracking the reconstructed image quality metric as the operational parameters are modified, it is possible to refine the estimate of the operational parameters and obtain and optimal reconstruction.

Tracking the power spectrum content of the high spatial frequencies in the reconstructed image works well if the object being imaged includes isolated objects that are approximately equal to or smaller than the beam waist of the illumination beam. However, it is desirable to be able to reconstruct images of objects that do not contain small and isolated objects. It is further desirable to reduce the optical effect of the surface of the object. These optical effects include Fresnel surface reflections and field distortions produced by the object's proximal surface corrugations.

Attaching a window to the surface of the object and index matching the window to the object both reduces Fresnel reflection losses as well as minimizes field distortions from the object surface. The use of windows in confocal imaging is well known (U.S. Pat. No. 7,813,788). However, previous work did not include incorporating features in the window to both assess the optical performance of the imaging system or provide deterministic and reproducible features to aid in ISAM reconstruction and characterization of the ISAM reconstruction.

An additional consideration is required when the imaging system involves diagnostic testing of medical samples in the United States, which requires a certification under the Clinical Laboratory Improvement Amendments (CLIA). CLIA applies to diagnostic procedures performed with microscopes. CLIA instituted uniform quality standards for all laboratory testing to ensure accuracy and reliability of laboratory tests results independent of testing location. CLIA applies to provider-performed microscopy and outlines applicable quality standards associated with the microscopic imaging of certain medical specimens. To satisfy the quality standards, ISAM microscopes must capture the optical field with sufficient fidelity to allow reconstruction and the parameters of the associated with the scan, and capture must be characterized to allow for the ISAM reconstruction. It follows that images produced by ISAM reconstruction that are used for medical diagnosis require quality validation pertaining to the optical imaging system that captured the data and the ISAM reconstruction. The following description illustrates one embodiment of a validation tool that may be included in any of the microscopes described herein. This validation tool provides information on the resolution of the instrument and the scan parameters of the optical field acquisition.

Figure 7A:
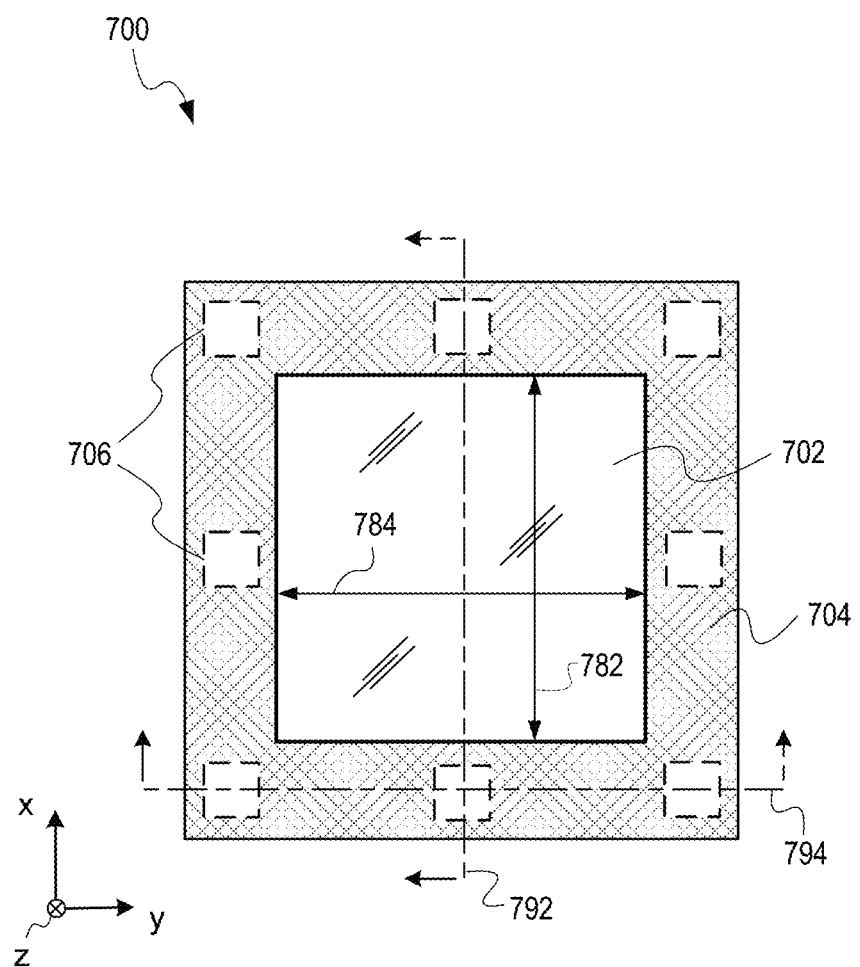

FIGS. 7A, 7B, and 7C illustrate three views of an embodiment of a validation window 700 (window 700 henceforth) that is mounted on or above a sample to either assist in ISAM reconstruction, validate the optical system performance, or both. FIG. 7A is a top view of window 700 in a plane parallel to the x-y plane. FIG. 7A denotes section lines 792 and 794 that indicate the locations of the orthogonal cross-sectional cut-out views of window 700 illustrated in FIGS. 7B and 7C, respectively. FIGS. 7A, 7B, and 7C are best viewed together in the following description.

In an embodiment, window 700 approximately matches the imaging field of view of a microscope, such as microscope 500. The geometry of window 700 may be nominally square. Window 700 includes an internal region 702 and a peripheral region 704. Window 700 may be placed on or above a sample (e.g., sample 242) between an objective lens (e.g., objective lens 136, 236, 570 or 580) and the sample. Window 700 has a top surface 713 that is closer to the objective lens and a bottom surface 714 that is closer to the sample. In an example use scenario, for window 700 placed between objective lens 570 and sample 242 in microscope 500 of FIG. 5A, incident beam 562 is transmitted through window 700, and scattered beams 564 from sample 242 returns through window 700.

Internal region 702 has a width 784, a length 782, and a thickness 786. Internal region 702 may be optically transparent and homogeneous. Internal region 702 may be made of a material having a refractive index approximately equal to that of the sample. In an embodiment, thickness 786 is approximately between 0.1 mm and 1.0 mm. The objective lens may be designed to be used with thickness 786 and refractive index of internal region 702. Length 782 and width 784 of internal region 702 correspond to the nominal field of view of the sample to be imaged and reconstructed.

Peripheral region 704 surrounds internal region 702. The nominal refractive index and thickness of region 704 may be the same as internal region 702, such that the imaging performance over both regions 702 and 704 is similar. Peripheral region 704 includes feature regions 706 that include features that are either embedded within, and/or on the surface of peripheral region 704. Feature regions 706 may then be used to assess the imaging performance of the overall imaging system or to extract operational parameters for optimal ISAM reconstruction.

Feature region 706 includes at least one of features 719 and 724. Features 719 and 724 may be fabricated on top surface 713 of window 700 facing the objective lens as shown in the detailed illustration of a location 722. Feature region 706 may also include at least one of features 716 and 718 that face the sample as shown in the detailed illustration of a location 715. Bottom surface 714 may also include a sub-plate 720 that is laminated to the silicone/plate assembly to complete window 700. Feature 719 is a slanted surface that operates in a similar way as feature 716 and may provide information about the longitudinal (axial) resolution. In an embodiment, a depth 787 of feature 719 and a depth 789 of feature 716 are between 0.2 μm and 100 μm. Feature 716 has a slant that forms a slant angle 717 from bottom surface 714. The slant angle may be large enough so that the change in z-position of the interface over the width of the slanted feature is at least equal to the full width half maximum of the vertical point spread function of the microscope. For example, for systems with numerical apertures of 0.5 operating at nominal wavelength of 1.3 μm, the height of the slanted feature should be at least 4 μm. Alternatively, the slant angle 717 may be 0.1 radians. At this angle, the change in z-position is 0.1 in lateral position. Feature 724 includes a single or multiple rectangular structure(s) fabricated on top surface 713. Feature 724 may be a single isolated feature or a set of regularly-spaced features that form a one-dimensional or two-dimensional grating. For example, feature 724 may be a single rectangular feature having x- and y-dimensions greater than fifty times the lateral resolution of the imaging system. In an embodiment, a z-depth 785 of feature 724 is between approximately 0.2 µm and 100 µm and nominally uniform over its area. Features included in feature regions 706 may be arranged differently or have different shapes than shown in the detailed illustrations of locations 715 and 722 without departing from the scope.

The upper and lower surfaces of features 718 are nominally parallel to each other. As such the upper and lower surfaces define the etalon cavity of a Fabry-Perot interferometer. The light reflected by a Fabry-Perot interferometer is a function of the etalon thickness and index of refraction and the wavelength of the light incident on the etalon. The irradiance reflectance from the etalon follows the formula:

$$R = \frac{4|\rho|^2 \sin^2 \beta}{(1-|\rho|^2)^2 + 4|\rho|^2 \sin^2 \beta}, \quad (8)$$

where $|\rho|$ is the magnitude of the amplitude Fresnel reflectivity off the etalon interfaces (assumed to be equal), and is the phase thickness of the etalon at wavelength $\lambda$. The phase thickness of the etalon is $$\beta = \frac{2\pi n_e t \cos\theta}{\lambda},$$

where $n_e$ is the index of the etalon, t is the physical thickness of the etalon, and $\theta$ is the angle of the light propagation inside the etalon. The lateral size (x- and y-directions) of the etalon cavity should be preferably at least 10 lateral resolution elements.

In confocal imaging systems, such as microscopes 100, 200, 400, and 500, a swept-source laser can be used to provide illumination. The initial value and separation of the samples of the illumination k-vector from the swept-source laser are needed for the ISAM reconstruction algorithm. In a preferred embodiment, the etalon defined by 718 is filled with air, and the nominal central wavelength of the swept source is between 0.5 µm to 1.6 µm. In this case, the nominal thickness of etalon can between 10 µm and 200 µm, with thinner etalons desirably used with shorter wavelength sources. Measuring the reflectance of the etalon as the swept-source laser varies its operating wavelength provides a set of data that can be fit to Fabry Perot reflectance equation to estimate the laser wavelength at each point in its sweep. From this fit, the initial value and separation of the samples of the illumination k-vector from the swept-source laser can be found for the ISAM reconstruction algorithm. Using an air etalon is preferred when using large-bandwidth swept sources since the refractive index dispersion effects are minimized. Multiple etalon thicknesses can be fabricated on one window to allow for a single window design to be used with different illumination wavelengths or the measured reflectances from the different thickness etalons to be used to reduce uncertainty in the estimated illumination k-vector and detect variations in the illumination k-vector at different regions of the image.

Imaging the features with the illumination beam waist at surface 713 or 714 provides data required to implement the ISO-12233 standard measurement of the imaging system spatial frequency response (SFR). The SFR correlates to the modulation transfer function (MTF) that reports the system imaging response as a function of sample spatial frequency. The ISO-12233 standard may be applied at greater than twenty times the lateral resolution of the imaging system. The depths of the features, such as z-depth 785, is nominally uniform in the x-direction among the features so as to provide equal depth grating. The depth of any given feature is nominally uniform in the y-direction. In an embodiment, the depth of the grating is between approximately 0.2 µm and 100 µm. Imaging this feature with the illumination beam waist at surface 713 provides data needed estimate the MTF of the system for the spatial frequency of feature 724. In a related embodiment, the spatial frequency of the grating linearly varies in the x-direction with a spatial periodicity (pitch). The length of this chirped grating may be at least 100 times the lateral resolution of the imaging system. In an embodiment, the depth of the grating is selectable between 0.2 µm and 100 µm.

In an embodiment, feature 724 is a two-dimensional grating with the spatial frequency fixed along the x-direction but varying in the y-direction. In another embodiment, feature 724 is a two-dimensional grating having the spatial frequency varying along both the x and y directions. When feature 724 is a two-dimensional grating, the overall size of the grating is larger, and the x-y region of feature 724 is large enough, such that the spatial periodicities (pitch) of the features may vary.

Regions 702 and 704 may be made of polyethylene terephthalate, polyether ether ketone or amorphous polyolefin. Regions 704 may also be made of opal glass, plastic, silicone or a fluoropolymer. Scatterers within region 704 may have higher or lower refractive index than the base material. Scatters may include micro particles of $TiO_2$ or $Al_2O_3$, polystyrene microspheres or solid or hollow glass microspheres.

In one embodiment, window 700 is fabricated by (i) selecting a glass or plastic plate that forms internal region 702, (ii) placing the plate centered within a mold cavity and resting on the lower mold cavity surface, and (iii) casting features, such as features 716, 718, 719 and 724, in silicone to form peripheral region 704. The lower mold cavity has dimensions that are larger than the plate. Peripheral region 704 is formed surrounding the centered plate within the mold cavity. The bottom surface of the mold cavity has structures that impart features 718 and 716. In the step of casting, $TiO_2$ particles (approximately 1 µm diameter) are mixed in silicone, and the mixture is degassed to remove air bubbles. The mixture is then poured in to fill the bottom cavity of the mold. An upper mold plate is added to form features 719 and 724. After curing, sub-plate 720 may be laminated to the silicone/plate assembly to form bottom surface 714 of window 700. Plastic insert injection molding techniques may be used in place of silicone casting where region 704 is over-molded around the plate that forms region 702. When using insert injection molding, suitable microparticles that form the scatterers in regions 704 are precast or otherwise mixed in a polymer at the appropriate concentration. This polymer-microparticle mixture is then formed into pellets that are melted and then over-molded around the plate insert. The injection mold may have structures that produce features 716, 718, 719 and 724 in the bottom and upper surfaces of the mold, respectively. After the injection molding, sub-plate 720 may be laminated to form bottom surface 714 of window 700.

Figure 8:
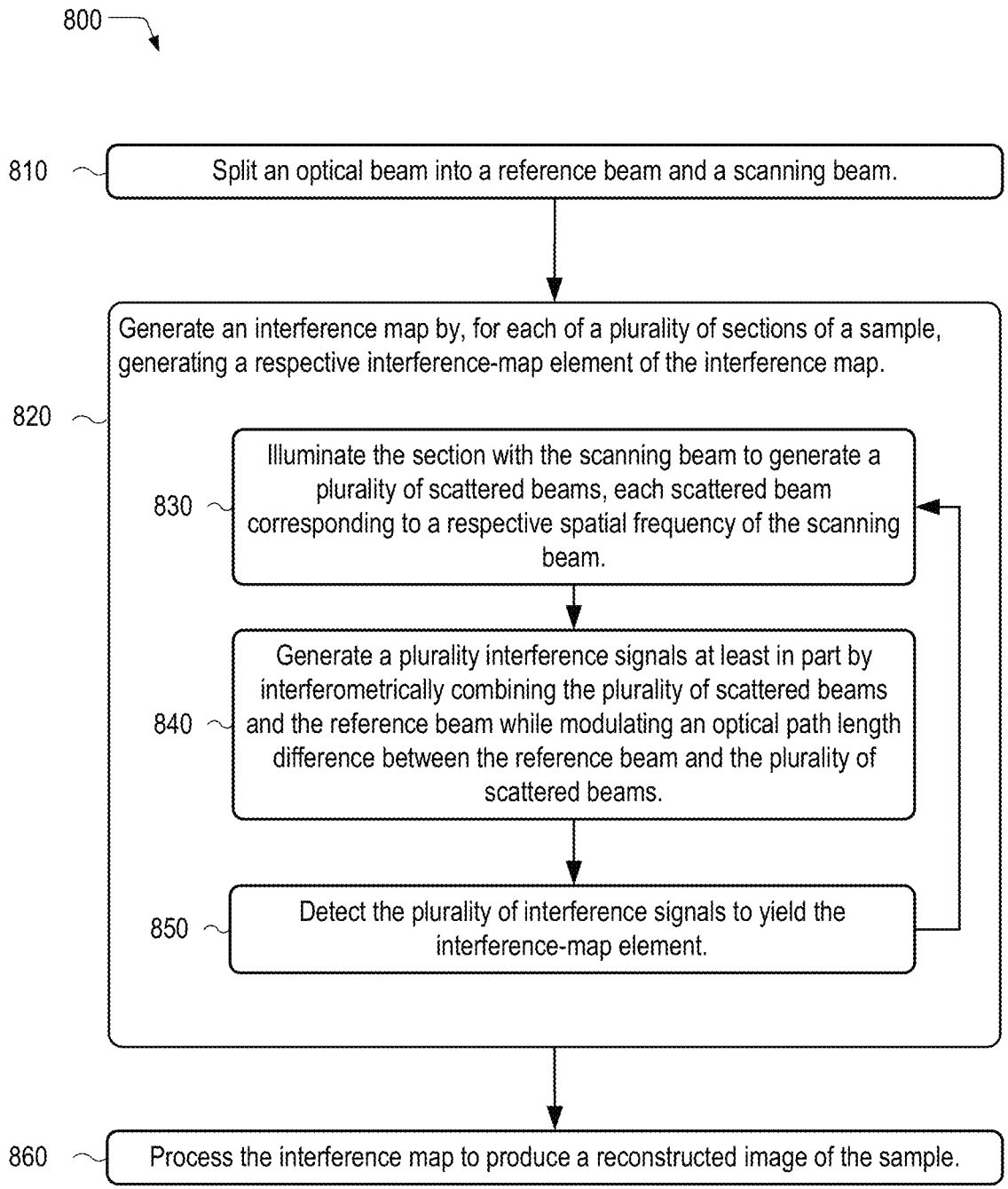
FIG. 8 is a flowchart illustrating a method for reconstructing a scanned image using an interferometric confocal scanning microscope, in an embodiment.

FIG. 8 is a flowchart illustrating a method 800 for reconstructing a scanned image using an interferometric confocal scanning microscope. The scanned image may be a single two-dimensional image (x-y) or a set of two-dimensional images (x-y). Method 800 may be implemented by part or all of any of microscopes 100, 200, 400, 500, and system 600. Method 800 includes steps 810, 820, and 860.

Step 810 includes splitting an optical beam into a reference beam and a scanning beam. For depth information, the optical beam may be from one of a broadband source, such as a low-coherence broadband source, and a swept-wavelength source. In one example of step 810, light propagating in optical fiber 212 from illuminating source 222 of microscope 200 is divided by beam splitter 226 into reference beam 260 and incident beam 262. In another example of step 810 where an open-air optical system is implemented, light 118 from illuminating source 122 of microscope 100 is divided by beam splitter 126 into reference beam 160 in reference arm 191, and incident beam 162 in probing arm 193. Further, in a system where an interferometric objective is used, microscope 500 for example, illuminating light 518 from illuminating source 222 enters objective 570 and is divided by beam splitter 527 into incident beam 562 and reference beam 560.

Step 820 includes generating an interference map by, for each of a plurality of sections of a sample, generating a respective interference-map element of the interference map. Step 820, which includes steps 830, 840, and 850, may be repeated for every section on the transverse plane of the sample is measured. In one example of step 820, sample 242 in FIG. 6 is divided into N sections, where N is a positive integer greater than or equal to one, from 643(1) to 643(N). Steps 830, 840, and 850 are repeated for each section 643(i), where i is between one and N.

Step 830 includes illuminating the section with the scanning beam to generate a plurality of scattered beams, each scattered beam corresponding to a respective spatial frequency of the scanning beam. In one example of step 830, simulated sample 372 in FIG. 3A has incident beam 162 focused in a section. For a depth profile of the section, the frequency of incident beam 162 is scanned, such that each scattered beam from a certain depth position within the section is associated with the frequency (and hence the wavenumber k) of the incident beam 162. Light cone 369 illustrates the axial area (i.e., depth) where scatter points, such as scatter point 395, can generate scatter beams from their respective depths.

Step 840 includes generating a plurality of interference signals at least in part by interferometrically combining the plurality of scattered beams and the reference beam while modulating an optical path length difference between the reference beam and the plurality of scattered beams. In one example of step 840, modulation of optical path length of reference beam 260 by modulating reference mirror 128 of microscope 200 produces modulated reference beam, which is interferometrically combined with scatter beams, such as the scatter beams of step 830, in beam splitter 226. Additionally, in a system where an interferometric objective is used, microscope 500 for example, modulation of the optical path length of incident beam 562 by modulating via PZT at least one of objective 570 and sample holder 543, produces phase difference between reference beam 560 and incident beam 562. Scattered beams 564, such as the scattered beams of step 830, the optical path lengths of which are also modulated from modulating that of incident beam 562, are interferometrically combined with reflected reference beam 561 by beam splitter 527.

Step 850 includes detecting the plurality of interference signals to yield the interference-map element. When the optical beam in step 810 is from a low-coherence broadband source, the detecting of step 850 may be done with a spectrally sensitive detector, such as one based on a spectrometer. In one example of step 850, interferometrically combined beams of step 840 from section 643(1) in sample 242 of system 600 are detected by photodetector 224 for a scanning period, which may be determined by at least one of: size of the sample, complexity of the sample, frequency of phase modulation, and numerical aperture of the objective lens. In embodiments, the scanning period may be an order of magnitude smaller than the period of phase modulation. Detected interference signals for section 643(1) from photodetector 224 may be stored in location 673(1) in detected three-dimensional data 672 in memory 604. Steps 830, 840 and 850 may be performed for each section 643(i) of sample 242 until all N sections have been scanned to complete detected three-dimensional data 672.

Step 860 includes processing the interference map to produce a reconstructed image of the sample. In one example of step 860, detected three-dimensional data 672 is processed to produce reconstructed three-dimensional image 608. In another example, simulated sample 372 of FIG. 3A, which has random scatter points at various depths including scatter points 391 and 395, is processed using simulated s-SPM and ISAM to reconstruct simulated sample 372 into a reconstructed sample 371 in reconstructed image 308, where the simulated scatter points, including scatter points 391 and 395 at different depths, are correctly reconstructed as reconstructed scatter points 394 and 397. Details of step 860 are further described in method 900 in FIG. 9.

Figure 9:
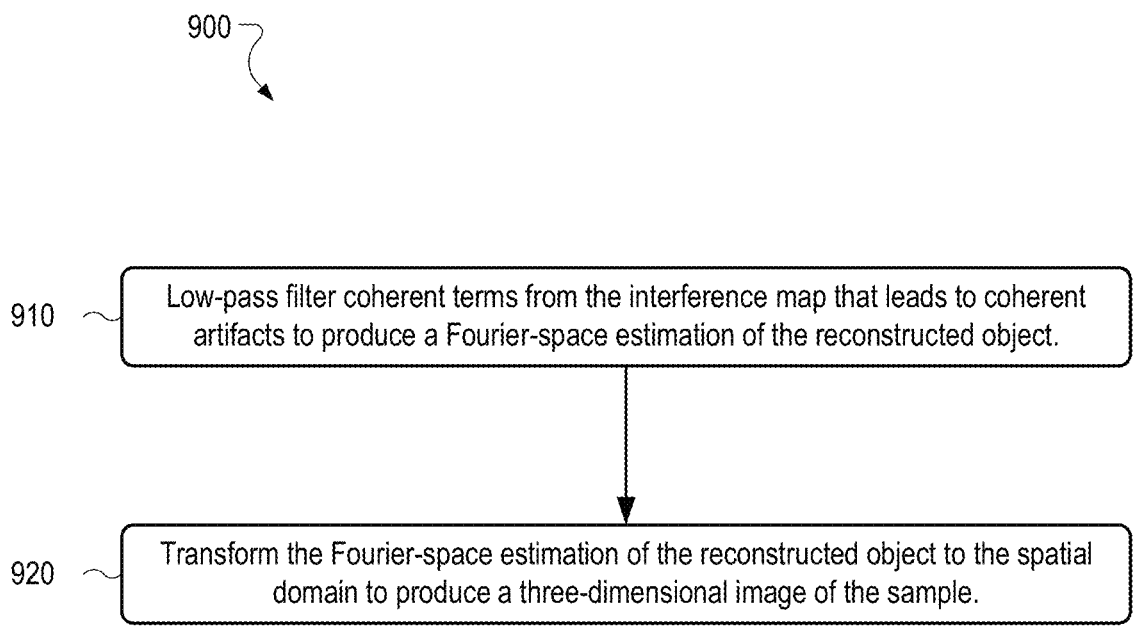
FIG. 9 is a flowchart illustrating a method for processing the interference map, in an embodiment.

FIG. 9 is a flowchart illustrating a method 900 for processing the interference map of step 860. Method 900 may be implemented by part or all of any of microscopes 100, 200, 400, 500, and system 600. Method 900 includes steps 910 and 920.

Step 910 includes low-pass filtering coherent terms that leads to coherent artifacts to produce a Fourier-space estimation of the reconstructed object. In an example of step 910, detected three-dimensional data 672 of FIG. 6 is low-pass filtered for filtering out the coherent terms that lead to coherent artifacts, provided the coherent terms do not overlap in the frequency domain. This step provides an effective means to significantly reduce coherent artifacts in the image reconstruction. Additionally, an optional ISAM reconstruction algorithm such as equation (7) may be implemented on Fourier-space estimation of the object reconstruction prior to implementing step 920. This ISAM construction algorithm reduces or removes depth-dependent defocus.

Step 920 includes transforming the Fourier-space estimation of the reconstructed object to the spatial domain to produce a three-dimensional image of the sample. In an example of step 920, detected three-dimensional data 672 in the Fourier frequency domain is transformed to reconstructed three-dimensional image 608 in the space domain. In another example of step 920, simulated sample 372 (FIG. 3A) is reconstructed as reconstructed sample 371 in reconstructed image 308 in FIG. 3D after being transformed back to space domain.

Reconstructed image 308 is free of coherent artifacts and depth-dependent defocus. Scatter points 391 and 395 in simulated sample 372 are correctly reconstructed as reconstructed scatter points 394 and 397 in reconstructed sample 371 without any artifacts.

Although FIGS. 8 and 9 show example steps of methods 800 and 900, respectively, in some implementations, methods 800 and 900 may include additional blocks, fewer blocks, different blocks, or differently arranged blocks than those depicted in FIGS. 8 and 9. Additionally, or alternatively, two or more of the steps of methods 800 and 900 may be performed in parallel.

Combinations of Features

Features described above as well as those claimed below may be combined in various ways without departing from the scope hereof. The following enumerated examples illustrate some possible, non-limiting combinations.

(A1) A scanning imaging method includes splitting an optical beam into a reference beam and a scanning beam, generating an interference map, and processing the interference map to produce a reconstructed image of a sample. Generating the interference map includes, for each of a plurality of sections of the sample, generating a respective interference-map element of the interference map by: (i) illuminating the section with the scanning beam to generate a plurality of scattered beams, each scattered beam corresponding to a respective spatial frequency of the scanning beam, (ii) attenuating the reference beam, (iii) generating a plurality of interference signals at least in part by interferometrically combining the plurality of scattered beams and the attenuated reference beam while modulating a phase difference between the reference beam and the plurality of scattered beams, and (iv) detecting the plurality of interference signals to yield the respective interference-map element.

(A2) In the method denoted (A1), said step of processing includes (i) low-pass filtering coherent terms from the interference map to produce a Fourier-space estimation of the reconstructed image of the sample, and (ii) transforming the Fourier-space estimation to space domain to produce a three-dimensional reconstructed image of the sample (A3) In either of the methods denoted (A1) and (A2), said step of splitting an optical beam includes splitting a broadband laser source.

(A4) In any of the methods denoted (A1)-(A3), modulating a phase difference includes modulating a displacement of a reference mirror along an optical path of the reference beam.

(A5) In the method denoted (A4), modulating a displacement includes sinusoidally modulating the displacement.

(A6) In any of the methods denoted (A1)-(A5), modulating a phase difference includes modulating displacement of an interferometric objective along an optical path of the scanning beam.

(A7) In any of the methods denoted (A1)-(A6), modulating a phase difference includes modulating displacement of the sample in a direction of the scanning beam.

(A8) In the method denoted (A7), modulating the displacement includes sinusoidally modulating the displacement.

(A9) In any of the methods denoted (A1)-(A8), modulating a phase difference includes modulating a phase of the reference beam using a controllable photonic device.

(B1) A system for three-dimensional imaging of a sample includes a beam splitter, a scanner, a phase modulator, a beam attenuator, a confocal microscope, and a processor. The beam splitter splits an optical beam into a reference beam and a scanning beam. The scanner focuses the scanning beam onto or within a section of a plurality of sections of the sample, each section producing a respective plurality of scattered beams. The phase modulator modulates a phase of the reference beam. The beam attenuator is located in an optical path of the reference beam for producing an attenuated reference beam. The confocal microscope, for each of the plurality of sections, interferometrically combines the attenuated reference beam and the respective plurality of scattered beams and generates a respective one of a plurality of two-dimensional images. The processor generates a three-dimensional image of the sample based on the plurality of two-dimensional images.

(B2) The system denoted (B1) further includes a broadband laser source that generates the optical beam.

(B3) In either of the systems denoted (B1) or (B2), the confocal microscope includes an objective lens that is one of Michelson interferometric objective and Mirau interferometric objective.

(B4) Any of the systems denoted (B1)-(B3) further includes, between an objective lens of the confocal microscope and the sample, a validation window having: (i) a transparent region, located directly above the sample, that allows the scanning beam and scattered beams from the sample to propagate unaltered; and (ii) a validation region that, when a beam waist of the scanning beam is located on validation features of the validation region, allows dimensional measurements of the validation features, the validation region not overlapping the transparent region.

(B5) In the system denoted (B4), the validation features have shapes fabricated or embedded on a surface of the validation region that is closer to the sample. The shapes include at least one of a slanted surface and a rectangular structure.

(B6) In either of the systems denoted (B4) or (B5), the validation features have a depth between 0.2 micrometers and 100 micrometers.

(B7) In any of the systems denoted (B4)-(B6), the transparent region has a refractive index approximately equal to a refractive index of the sample.

(B8) In any of the systems denoted (B1)-(B7), the beam attenuator includes an ultraviolet illumination source, a photochromic window, and an optical detector. The photochromic window is (a) optically coupled to the ultraviolet illumination source such that it absorbs illumination from the ultraviolet illumination source, and (b) located in an optical path of the reference beam before the reference beam is combined with scattered beams from the sample. The optical detector detects the reference beam after the reference beam passes through the photochromic window.

(B9) In any of the systems denoted (B1)-(B8), the phase modulator is one of a piezo-actuated objective scanner and a piezo-actuated sample scanner.

(B10) In any of the systems denoted (B1)-(B9), the phase modulator generates sinusoidal modulation.

(B11) In any of the systems denoted (B1)-(B10), the confocal microscope includes optical fiber interconnects that capture the scanning beam scattered only from a focal plane of the confocal microscope.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A scanning imaging method comprising:
splitting an optical beam into a reference beam and a scanning beam;
generating an interference map by, for each of a plurality of sections of a sample, generating a respective interference-map element of the interference map by:
illuminating the section with the scanning beam to generate a plurality of scattered beams, each scattered beam corresponding to a respective spatial frequency of the scanning beam;
attenuating the reference beam;
generating a plurality of interference signals at least in part by interferometrically combining the plurality of scattered beams and the attenuated reference beam while modulating a phase difference between the reference beam and the plurality of scattered beams; and
detecting the plurality of interference signals to yield the respective interference-map element; and
processing the interference map to produce a reconstructed image of the sample.

2. The method of claim 1, wherein processing comprises:
low-pass filtering coherent terms from the interference map to produce a Fourier-space estimation of the reconstructed image of the sample; and
transforming the Fourier-space estimation to space domain to produce a three-dimensional reconstructed image of the sample.

3. The method of claim 1, said step of splitting an optical beam comprises splitting a broadband laser source.

4. The method of claim 1, wherein modulating a phase difference comprises modulating a displacement of a reference mirror along an optical path of the reference beam.

5. The method of claim 4, wherein modulating a displacement comprises sinusoidally modulating the displacement.

6. The method of claim 1, wherein modulating a phase difference comprises modulating displacement of an interferometric objective along an optical path of the scanning beam.

7. The method of claim 1, wherein modulating a phase difference comprises modulating displacement of the sample in a direction of the scanning beam.

8. The method of claim 7, wherein modulating the displacement comprises sinusoidally modulating the displacement.

9. The method of claim 1, wherein modulating a phase difference comprises modulating a phase of the reference beam using a controllable photonic device.

10. A system for three-dimensional imaging of a sample, comprising:
a beam splitter that splits an optical beam into a reference beam and a scanning beam;
a scanner that focuses the scanning beam onto or within a section of a plurality of sections of the sample, each section producing a respective plurality of scattered beams;
a phase modulator that modulates a phase of the reference beam;
a beam attenuator located in an optical path of the reference beam for producing an attenuated reference beam;
a confocal microscope that (i) includes an objective lens and (ii), for each of the plurality of sections, interferometrically combines the attenuated reference beam and the respective plurality of scattered beams and generates a respective one of a plurality of two-dimensional images;
a validation window located between the objective lens and the sample and having (i) a transparent region, located directly above the sample, that allows the scanning beam and scattered beams from the sample to propagate unaltered; and (ii) a validation region that, when a beam waist of the scanning beam is located on validation features of the validation region, allows dimensional measurements of the validation features, the validation region not overlapping the transparent region; and
a processor that generates a three-dimensional image of the sample based on the plurality of two-dimensional images.

11. The system of claim 10, further comprising a broadband laser source that generates the optical beam.

12. The system of claim 10, the confocal microscope comprising an objective lens that is one of Michelson interferometric objective and Mirau interferometric objective.

13. The system of claim 10, further comprising, between an objective lens of the confocal microscope and the sample, a validation window having:
a transparent region, located directly above the sample, that allows the scanning beam and scattered beams from the sample to propagate unaltered; and
a validation region that, when a beam waist of the scanning beam is located on validation features of the validation region, allows dimensional measurements of the validation features, the validation region not overlapping the transparent region.

14. The system of claim 13, the validation features having shapes fabricated or embedded on a surface of the validation region that is closer to the sample, the shapes including at least one of a slanted surface and a rectangular structure.

15. The system of claim 13, the validation features having a depth between 0.2 micrometers and 100 micrometers.

16. The system of claim 13, the transparent region having a refractive index approximately equal to a refractive index of the sample.

17. The system of claim 13, the validation window having a thickness between 0.1 millimeter and 1.0 millimeter.

18. The system of claim 10, A system for three-dimensional imaging of a sample, comprising:
a beam splitter that splits an optical beam into a reference beam and a scanning beam;
a scanner that focuses the scanning beam onto or within a section of a plurality of sections of the sample, each section producing a respective plurality of scattered beams;
a phase modulator that modulates a phase of the reference beam;
a beam attenuator located in an optical path of the reference beam for producing an attenuated reference beam;
a confocal microscope that, for each of the plurality of sections, interferometrically combines the attenuated reference beam and the respective plurality of scattered beams and generates a respective one of a plurality of two-dimensional images; and
a processor that generates a three-dimensional image of the sample based on the plurality of two-dimensional images;
wherein the beam attenuator includes:
an ultraviolet illumination source;
a photochromic window that is (a) optically coupled to the ultraviolet illumination source such that it absorbs illumination from the ultraviolet illumination source, and (b) located in an optical path of the reference beam before the reference beam is combined with scattered beams from the sample; and
an optical detector that detects the reference beam after the reference beam passes through the photochromic window.

19. The system of claim 10, wherein the phase modulator is one of a piezo-actuated objective scanner and a piezo-actuated sample scanner.

20. The system of claim 10, wherein the phase modulator generates sinusoidal modulation.

21. The system of claim 10, wherein the confocal microscope comprises optical fiber interconnects that capture the scanning beam scattered only from a focal plane of the confocal microscope.

* * * * *